United States Patent
Kim et al.

(10) Patent No.: US 9,743,401 B2
(45) Date of Patent: Aug. 22, 2017

(54) METHOD, USER EQUIPMENT AND BASE STATION FOR CONFIGURING RADIO FRAME FOR OFFSETTING DOPPLER EFFECT

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 14/437,462

(22) PCT Filed: Oct. 22, 2013

(86) PCT No.: PCT/KR2013/009425
§ 371 (c)(1),
(2) Date: Apr. 21, 2015

(87) PCT Pub. No.: WO2014/065568
PCT Pub. Date: May 1, 2014

(65) Prior Publication Data
US 2015/0264683 A1    Sep. 17, 2015

Related U.S. Application Data

(60) Provisional application No. 61/716,628, filed on Oct. 22, 2012.

(51) Int. Cl.
*H04W 72/04*    (2009.01)
*H04L 5/00*    (2006.01)
*H04L 27/26*    (2006.01)

(52) U.S. Cl.
CPC ....... *H04W 72/0446* (2013.01); *H04L 5/0007* (2013.01); *H04L 27/2602* (2013.01); *H04L 27/2657* (2013.01); *H04L 27/2688* (2013.01)

(58) Field of Classification Search
None
See application file for complete search history.

(56) References Cited

U.S. PATENT DOCUMENTS

| | | | |
|---|---|---|---|
| 8,982,822 B2* | 3/2015 | Ogawa | H04L 5/001 370/329 |
| 2005/0094552 A1* | 5/2005 | Abe | H04L 5/006 370/208 |

(Continued)

FOREIGN PATENT DOCUMENTS

| | | |
|---|---|---|
| JP | 2002-246967 | 8/2002 |
| KR | 10-2007-0017610 | 2/2007 |
| KR | 10-2007-0049091 | 5/2007 |
| KR | 10-2009-0057326 | 6/2009 |

(Continued)

OTHER PUBLICATIONS

European Patent Office Application No. 13849249.1, Search Report dated May 10, 2016, 7 pages.

(Continued)

*Primary Examiner* — Tejis Daya
(74) *Attorney, Agent, or Firm* — Lee Hong Degerman Kang Waimey

(57) ABSTRACT

Flexible employment of frame configuration in light of the Doppler frequency change is proposed. According to the present invention, frame configuration for a predetermined frequency band may be changed. Changing frame configuration in the present invention may include changing the number (≥0) of zero-power subcarriers which alternate with nonzero-power subcarriers.

16 Claims, 18 Drawing Sheets

(56) References Cited

U.S. PATENT DOCUMENTS

| | | | | |
|---|---|---|---|---|
| 2006/0115012 | A1* | 6/2006 | Sadowsky | H04L 27/2602 375/260 |
| 2006/0120473 | A1* | 6/2006 | Baum | H04L 1/04 375/260 |
| 2007/0173198 | A1* | 7/2007 | Kim | H04W 72/06 455/63.1 |
| 2008/0112478 | A1* | 5/2008 | Kawano | H04L 25/03159 375/230 |
| 2010/0054194 | A1* | 3/2010 | Chauncey | H04L 5/0007 370/329 |
| 2011/0032850 | A1* | 2/2011 | Cai | H04L 5/0023 370/280 |
| 2011/0103406 | A1* | 5/2011 | Cai | H04L 5/0044 370/480 |
| 2011/0211475 | A1* | 9/2011 | Murakami | H04B 1/692 370/252 |

FOREIGN PATENT DOCUMENTS

| | | |
|---|---|---|
| KR | 10-2009-0079771 | 7/2009 |
| KR | 10-2011-0033030 | 3/2011 |
| WO | 2009/031966 | 3/2009 |
| WO | 2009/062115 | 5/2009 |

OTHER PUBLICATIONS

J. Gross et al., "Performance Analysis of Dynamic OFDMA Systems with Inband Signaling," IEEE Journal on Selected Areas in Communications, vol. 24, No. 3, Mar. 1, 2006, XP055121662, 24 pages.

PCT International Application No. PCT/KR2013/009425, Written Opinion of the International Searching Authority dated Jan. 27, 2014, 17 pages.

Korean Intellectual Property Office Application Serial No. 10-2015-7012516, Notice of Allowance dated Feb. 1, 2016, 2 pages.

\* cited by examiner

METHOD, USER EQUIPMENT AND BASE STATION FOR CONFIGURING RADIO FRAME FOR OFFSETTING DOPPLER EFFECT

CROSS-REFERENCE TO RELATED APPLICATIONS

This application is the National Stage filing under 35 U.S.C. 371 of International Application No. PCT/KR2013/009425, filed on Oct. 22, 2013, which claims the benefit of U.S. Provisional Application No. 61/716,628, filed on Oct. 22, 2012, the contents of which are all hereby incorporated by reference herein in their entirety.

TECHNICAL FIELD

The present invention relates to a wireless communication system. More particularly, the present invention relates to a method and apparatus for configuring a radio frame.

BACKGROUND ART

With appearance and spread of machine-to-machine (M2M) communication, machine type communication (MTC), and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

As the density of nodes increases and/or the density of user equipments increases, a method for efficiently using a high density of nodes or a high density of user equipments for communication is needed.

In addition, with advances in technology, usage of conventionally unused frequency bands has been discussed. Since a newly introduced frequency band has different frequency characteristics from an existing frequency band, it is difficult to apply an existing frame structure without change. Therefore, introduction of a new frame structure is needed.

The technical objects that can be achieved through the present invention are not limited to what has been particularly described hereinabove and other technical objects not described herein will be more clearly understood by persons skilled in the art from the following detailed description.

Technical Solutions

The present invention does not keep an (effective) subcarrier spacing equal with respect to a specific frequency band having a great Doppler effect and offsets the Doppler effect by changing a subcarrier spacing or an effective subcarrier spacing.

In an aspect of the present invention, provided herein is a method for configuring a radio frame by a user equipment, including receiving frame configuration information; changing a frame configuration based on the frame configuration information from a first frame configuration to a second frame configuration; and transmitting or receiving a signal using a frame configured according to the second frame configuration.

In another aspect of the present invention, provided herein is a user equipment for configuring a radio frame, including a radio frequency (RF) unit and a processor configured to control the RF unit. The processor may cause the RF unit to receive frame configuration information. The processor may be configured to change a frame configuration based on the frame configuration information from a first frame configuration to a second frame configuration. The processor may cause the RF unit to transmit or receive a signal using a frame configured according to the second frame configuration.

In another aspect of the present invention, provided herein is a method for configuring a radio frame by a base station, including transmitting frame configuration information; changing a frame configuration according to the frame configuration information from a first frame configuration to a second frame configuration; and transmitting or receiving a signal using a frame configured according to the second frame configuration.

In another aspect of the present invention, provided herein is a base station for configuring a radio frame, including a radio frequency (RF) unit and a processor configured to control the RF unit. The processor may cause the RF unit to transmit frame configuration information. The processor may be configured to change a frame configuration based on the frame configuration information from a first frame configuration to a second frame configuration. The processor may cause the RF unit to transmit or receive a signal using a frame configured according to the second frame configuration.

In each aspect of the present invention, in changing the frame configuration, the number of subcarriers corresponding to a nonzero-power subcarrier spacing among a plurality of subcarriers in a frequency domain may be changed from '$N_1+1$' according to the first frame configuration to '$N_2+1$' according to the second frame configuration, wherein $N_1$ and $N_2$ are non-negative integers indicating the number of consecutive zero-power subcarriers configured between two nonzero-power subcarriers according to the first frame configuration and the second frame configuration, respectively.

In each aspect of the present invention, a subcarrier spacing $\Delta f_2$ of the frame configured according to the second frame configuration is equal to a subframe spacing $\Delta f_1$ according to the first frame configuration.

In each aspect of the present invention, a sampling frequency $f_{s,2}$ of the frame configured according to the second frame configuration is equal to a sampling frequency $f_{s,1}$ according to the first frame configuration.

In each aspect of the present invention, a sampling time $T_{s,2}$ of the frame configured according to the second frame configuration is equal to a sampling time $T_{s,1}$ according to the first frame configuration.

In each aspect of the present invention, the frame configuration information may be limitedly applied only to a resource region allocated to a specific user equipment in a specific frequency band.

In each aspect of the present invention, the frame configuration information may be applied to a total system bandwidth of the specific frequency band.

In each aspect of the present invention, the frame configuration information may be applied to a high frequency band exceeding a predetermined criterion.

In each aspect of the present invention, the frame configuration information may be applied to a user equipment moving at a high speed of a predetermined speed or more.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, efficient signal transmission/reception can be performed on a newly introduced frequency band. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
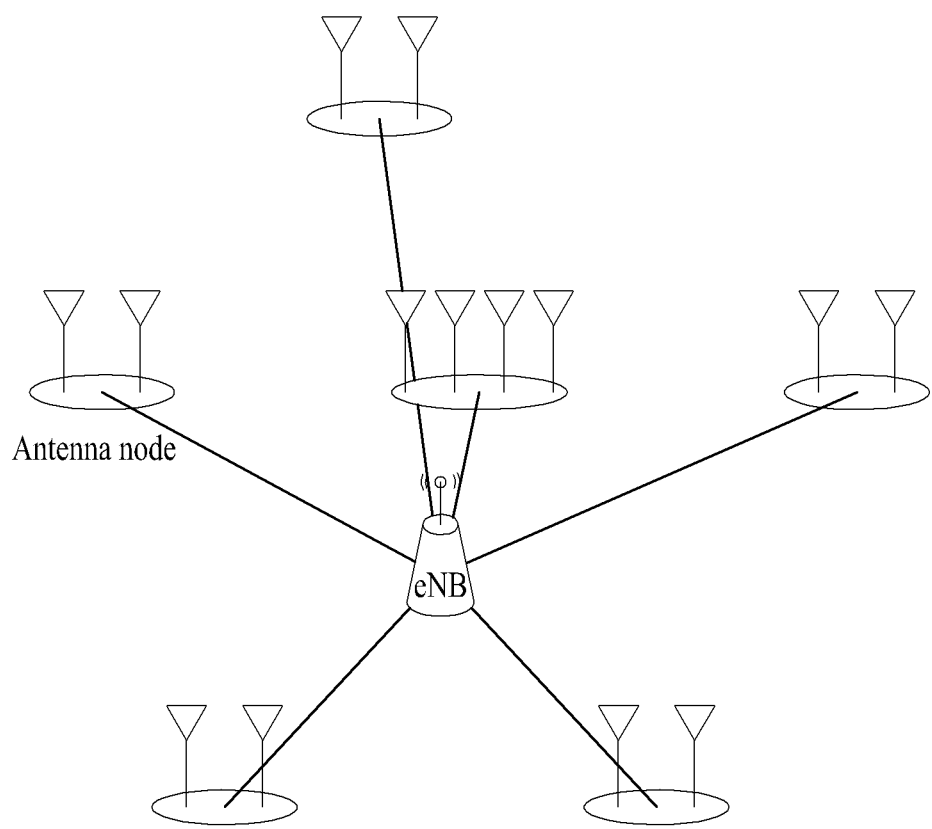
FIG. 1 illustrates a distributed antenna system (DAS) which is a type of multi-node system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi- Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver station (BTS), an access point (AP), a processing server (PS), etc. In describing the present invention, a BS will be referred to as an eNB.

In the present invention, a node refers to a fixed point capable of transmitting/receiving radio signals by communicating with a UE. Although the UE is also called a node or a point in a specific radio communication standard, the term node in the present invention is used as concept which contrasts with the UE. The node may be referred to as an access point or an access node in that the node is not a UE but a point that the UE accesses.

Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

FIG. 1 illustrates a distributed antenna system (DAS) which is a type of multi-node system.

Referring to FIG. 1, the DAS includes an eNB and antenna nodes connected to the eNB. An antenna node may be referred to as an antenna group, an antenna cluster, etc. The antenna node is connected to the eNB by wire or wirelessly and may include one or multiple antennas. Generally, antennas belonging to one antenna node have characteristics of being in the same regional spot, wherein the distance between nearest antennas is within a few meters. The antenna node serves as an antenna point that a UE may access.

Unlike a centralized antenna system (CAS) in which antennas of the eNB are centralized in the middle of a cell, the DAS is a system in which antennas managed by one eNB are distributed at various positions in a cell. The DAS is different from a femto cell or a pico cell in that multiple antenna nodes, that are not recognized as being located at one point because the antenna nodes are separately deployed at a predetermined interval, constitute one cell. The DAS of an early stage has been used to repeatedly transmit the same signal by further installing antennas in order to cover shadow zones. However, in a broad sense, the DAS is similar to a multiple input multiple output (MIMO) system in that the antennas of the eNB simultaneously transmit or receive multiple data streams to support one or multiple UEs. However, in conventional MIMO technology, antennas centralized in one point of the eNB participate in communication with the UE, whereas, in the DAS, at least one of distributed nodes of the eNB participates in communication with the UE. Therefore, the DAS has advantages of high power efficiency obtained by further reducing the distance between the UE and an antenna in comparison with the CAS, high channel capacity caused by low correlation and interference between eNB antennas, and guarantee of communication performance of relatively uniform quality regardless of the location of the UE in a cell.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by carrier aggregation or does not support carrier aggregation, a single serving cell configured by the PCell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting an effective signal, and UL coverage, which is a range within which the node is capable of receiving the effective signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with effective strength at other times.

Figure 2:
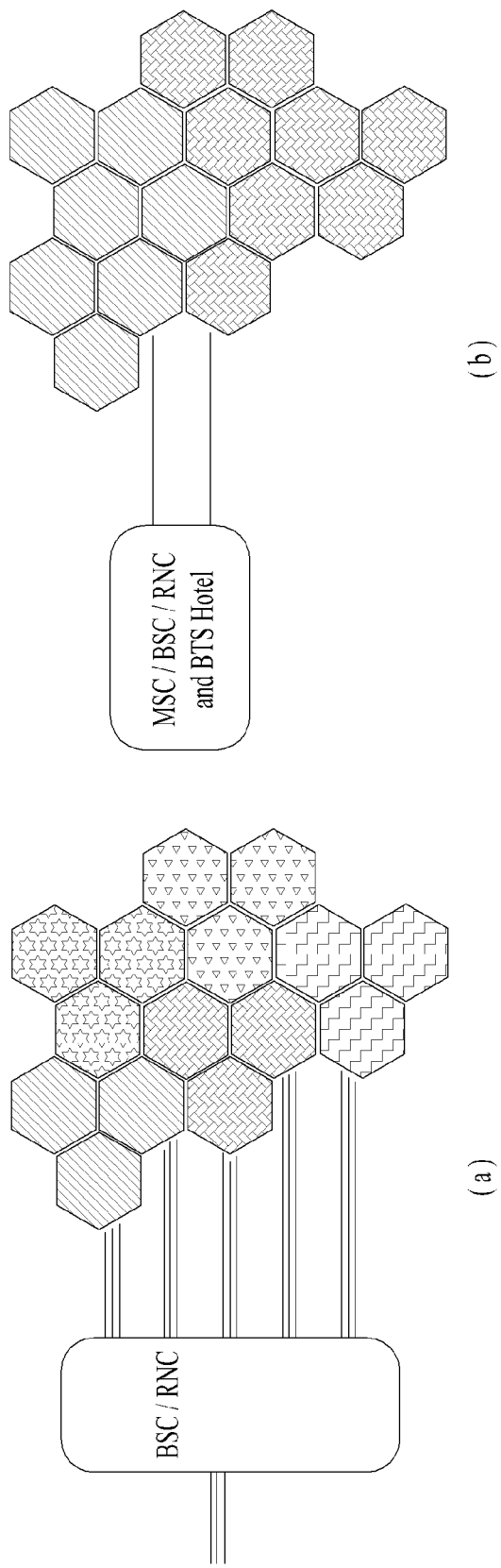
FIG. 2 is a diagram for explaining the concept of a base transceiver station (BTS) hotel of a multi-node system.

FIG. 2 is a diagram for explaining the concept of a base transceiver station (BTS) hotel of a multi-node system. In particular, FIG. 2(a) illustrates a traditional radio access network (RAN) architecture and FIG. 2(b) illustrates a small cell RAN architecture with a BTS hotel and a DAS. The concept of a small cell will be described in more detail with reference to FIG. 4.

Referring to FIG. 2(a), in a conventional cellular system, one BTS manages three sectors and each eNB is connected via a backbone network to a base station controller (BSC)/radio network controller (RNC). However, in a multi-node system such as a DAS, eNBs connected to respective antenna nodes may gather in one place (BTS hotel). Then, land in which the eNBs are to be installed and cost of buildings for installing the eNBs can be reduced and maintenance and management of the eNBs can be easily performed in one place. In addition, backhaul capacity can be increased by installing the BTS and a mobile switching center (MSC)/BSC/RNC together in one place.

Figure 3:
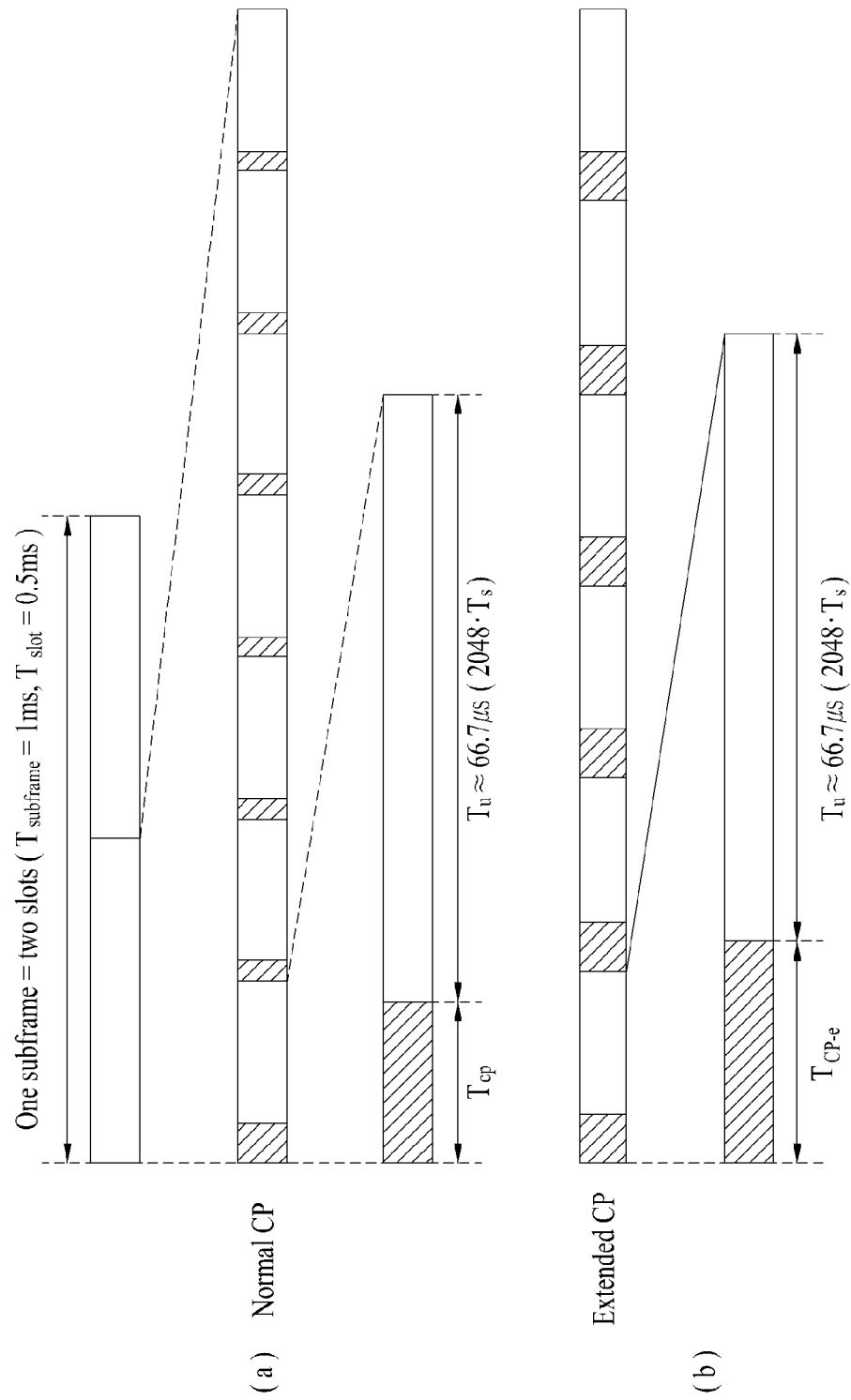
FIG. 3 illustrates a symbol structure used in a long term evolution (LTE) system.

FIG. 3 illustrates a symbol structure used in a long term evolution (LTE) system.

The duration $T_f$ of a radio frame used in a legacy LTE/LTE-A system is 10 ms (307200·$T_s$) and one radio frame includes 10 equal-sized subframes (SF). The 10 SFs in one radio frame may be assigned respective numbers. Here, $T_s$ denotes a sampling time, expressed by $T_s=1/(2048*15\text{ kHz})$. The length $T_{subframe}$ of each SF is 1 ms and one SF includes two slots. Therefore, one radio frame includes 20 slots each having a length $T_{slot}$ of 15360·$T_s$=0.5 ms. The 20 slots in one radio frame may be sequentially numbered from 0 to 19. The time for transmitting one SF is defined as a transmission time interval (TTI). A time resource may be distinguished by a radio frame number (also called a radio frame index), an SF number (also called an SF index), a slot number (also called a slot index), etc.

The legacy LTE/LTE-A system supports two types of frame structures according to the length of a cyclic prefix (CP) as illustrated in FIG. 3. Referring to FIG. 3(a), in the case of a normal CP, one slot includes 7 OFDM symbols, whereas, in the case of an extended CP, one slot includes 6 OFDM symbols. For reference, an OFDM symbol may be called an OFDM symbol or a single carrier-frequency division multiplexing (SC-FDM) symbol according to a multiple access scheme. Since SC-FDMA may be regarded as a special case of OFDMA, the term "symbol" or "OFDMA symbol" in the present invention is used to indicate an OFDM symbol and an SC-FDM symbol.

In FIG. 3, the length $T_{CP}$ of the normal CP is 160·$T_s \approx 5.1$ μs in the first OFDM symbol of an SF and is 160·$T_s \approx 4.7$ μs in the case of each of the other OFDM symbols of the SF. In FIG. 3, the length $T_{CP\text{-}e}$ of the extended CP is 512·$T_s \approx 16.1$ μs. In FIG. 3, $T_u$ denotes an effective OFDM symbol period representing time corresponding to the inverse of a subcarrier spacing.

The reason why an LTE/LTE-A system supports two CPs is that the LTE system is to support various scenarios of a cellular system. In actuality, the LTE system covers indoor, urban, suburban, and rural environments and supports a mobile speed of the UE up to 350 to 500 km/h.

A center frequency on which the LTE/LTE-A system operates is generally 400 MHz to 4 GHz and an available frequency band of the LTE/LTE-A system is 1.4 to 20 MHz. This means that delay spread and Doppler's frequency differ according to the center frequency and the available frequency band. In the case of the normal CP, a subcarrier spacing is Δf=15 kHz and the length of the CP is about 4.7 μs. In the case of the extended CP, the subcarrier spacing is the same as that of the normal CP and the length of the CP is about 16.7 μs. In the LTE system, the subcarrier spacing is predetermined and corresponds to a value obtained by dividing a sampling frequency by a fast Fourier transform (FFT) size. In the LTE system, a sampling frequency of 30.72 MHz is used and the subframe spacing Δf=15 kHz may be obtained by dividing 30.72 MHz by 2048 which is the FFT size used in the LTE system.

The extended CP may be used for a suburban cell or a rural cell which has relatively wide coverage due to a long CP duration. Generally, since delay spread increases in the suburban cell or the rural cell, the extended CP having a relatively long length is needed in order to solve inter-symbol interference (ISI). In the case of the extended CP, since CP overhead increases relative to the normal CP, there is a trade-off in that increase in a CP length causes loss of spectral efficiency and/or a transmission resource. Consequently, in the LTE/LTE-A system, the length of the normal CP and the length of the extended CP have been determined to support various deployment scenarios in which a cell is deployed in indoor urban, suburban, and rural environments. In determining the length of the CP, the following design criteria have been used.

$$T_{CP} \geq T_d \quad \text{[Equation 1]}$$

$$\frac{f_{dmax}}{\Delta f} \ll 1 \quad \text{[Equation 2]}$$

$$T_{CP}\Delta f \ll 1 \quad \text{[Equation 3]}$$

In Equation 1 to Equation 3, $T_{CP}$ denotes the length of a CP, $f_{dmax}$ denotes a (maximum) Doppler's frequency, and Δf denotes a subcarrier spacing. In Equation 1, $T_d$ denotes a maximum excess delay or a maximum channel delay, indicating the delay time of the last channel tap when a power delay profile (PDF) called a channel delay profile is given. For example, if the PDF is given such that the delay and power (relative power) of tap #0 are 10 ns and 0 dB, respectively, the delay and power (relative power) of tap #1 are 20 ns and −5 dB, respectively, . . . , and the delay and power (relative power) of tap #N are 500 ns and −20 dB, respectively, then $T_d$=500 ns.

Equation 1 indicates a criterion for preventing ISI, Equation 2 indicates a criterion for maintaining inter-cell interference (ICI) at a sufficiently low level, and Equation 3 indicates a criterion for spectral efficiency.

Meanwhile, in a future LTE system, introducing a local area is considered. That is, introduction of new cell deployment of the concept of local area access is considered in order to further strengthen service support for each user or UE. The local area is referred to as a small cell.

Figure 4:
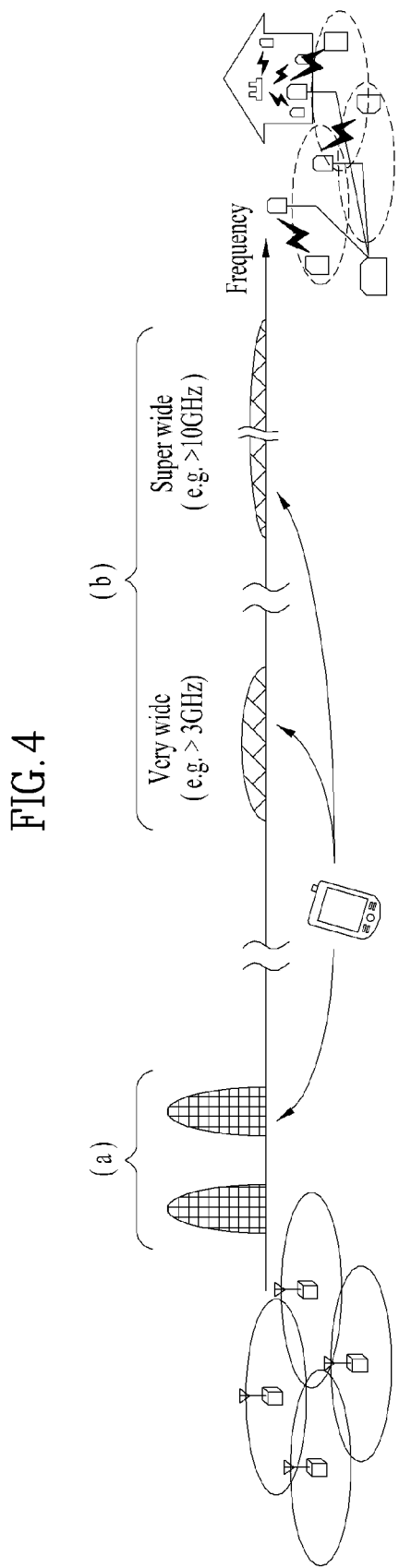
FIG. 4 is a diagram for explaining the concept of a small cell.

FIG. 4 is a diagram for explaining the concept of a small cell.

Referring to FIG. 4, a system bandwidth wider than a system bandwidth of a legacy LTE system may be configured for the small cell in a band having a higher center frequency than a center frequency operating in the legacy LTE system. If the small cell is used, basic cell coverage is supported based on a control signal such as system information through an existing cellular band and a wider frequency band is used in the small cell of a high frequency, so that data transmission efficiency can be maximized. Accordingly, local area access may be used for low-to-medium mobility UEs located in a narrow area and may be used for communication of small cells in which the distance between a UE and an eNB is in units of 100 m, which is smaller than an existing cell in which the distance between the UE and the eNB is in units of km.

In the small cells, channel characteristics described below are expected due to a short distance between a UE and a node and use of a high frequency band.

1) Delay spread: Delay of a signal may be shortened due to a short distance between an eNB and a UE.

2) Subcarrier spacing: If the same OFDM based frame structure as a frame structure of the LTE system is applied, since an allocated frequency bandwidth is wide, a value which is remarkably greater than an existing subcarrier spacing of 15 kHz may be configured as a subcarrier spacing.

3) Doppler's frequency: Since a high frequency band is used, a higher Doppler's frequency than a frequency when a low frequency band is used for a UE moving at the same speed may appear. Then, a coherent time which is a time duration during which a channel impulse response in a communication system is regarded as invariant may be remarkably shortened.

Due to these characteristics of a high frequency band, if an existing frame structure is applied to the high frequency band, ISI and ICI cannot be effectively prevented and spectral efficiency can be lowered. Therefore, the present invention proposes a frame structure for transmission on the high frequency band.

Generally, in the high frequency band having a center frequency $f_c$ of 5 GHz or more, delay spread of a channel tends to be shortened. In addition, path loss of the channel is greatly increased as a frequency band becomes high and thus stable performance can be guaranteed as the distance between the eNB and the UE decreases. Accordingly, future communication using the high frequency band is expected to employ a narrower cell structure than existing cellular communication and to identically use OFDM which is a multiple access scheme due to ease of resource utilization and control.

Definition of an OFDM Symbol for High Frequency Frame

In the present invention, system parameters for transmission of a high frequency band are defined as follows. Table 1 lists OFDM based system parameters for transmission of the high frequency band.

TABLE 1

| Parameter | Notation | Value | Remark or Note |
|---|---|---|---|
| Subcarrier-spacing | Δf | 104.25 kHz | Possible to modify for calibration |
| OFDM symbol period | $T_u$ | 9.59 μs | $T_u = 1/\Delta f$ |
| Guard Interval/ Cyclic Prefix | $T_{CP}$ | 0.5 μs | Multiple CP design is possible |
| OFDM symbol duration | $T_{SYM}$ | 10.09 μs | Total OFDM symbol duration |
| Overhead in terms of energy | $a_{overhead}$ | 5% | $\alpha_{overhead} = \frac{T_{CP}}{T_u + T_{CP}}$ $= \frac{\Delta f \cdot T_{CP}}{1 + \Delta f \cdot T_{CP}}$ |
| Efficiency in terms of energy | ηOFDM | 95% | $\eta_{OFDM} = 1 - \alpha_{overhead}$ $= \frac{T_u}{T_u + T_{CP}}$ $= \frac{1}{1 + \Delta f \cdot T_{CP}}$ |

TABLE 1-continued

| Parameter | Notation | Value | Remark or Note |
|---|---|---|---|
| Basic System BW (Target) | BW | 500 MHz | |
| FFT Size | $N_{FFT}$ | 4,096 | |
| OFDM sampling frequency | $f_s$ | 427.008 MHz | $\Delta f \times N_{FFT}$ |
| Available subcarriers | $N_{ac}$ | 4,096 | Including data, pilot, control & DC (Direct Current) subcarriers |
| Occupied BW | $B_{occ}$ | 427.008 MHz | $\Delta f \times N_{as}$ |
| Guard-band | $B_G$ | 47.445 MHz | $B_{sys} \times 0.1$ (10%) |
| Total System BW | $B_{sys}$ | 474.453 MHz | $B_{sys} = B_{occ} + B_G$ |

In generating an OFDM symbol, a CP should be necessarily inserted into the front part of an OFDM symbol (also called an OFDMA symbol) in order to prevent ISI. A CP duration of a current LTE system is determined to be 4.7 μs in the case of a normal CP and 16.7 μs in the case of an extended CP, as described previously. These CP values used in the current LTE system are determined by reflecting a power delay profile generated when a considerably wide cell is assumed. However, when considering the characteristics of a high frequency band and a small cell in which delay spread is expected to be relatively short, it is unnecessary to maintain a long CP duration. Therefore, for the high frequency band and the small cell, a remarkably short CP may be configured for operation. Reduction of the length of the CP leads to increase of transmission resources, thereby resulting in improved spectral efficiency. However, remarkable reduction in the length of all CPs may function as a critical factor for timing synchronization. In the LTE system, a UE generally acquires an initial timing through cell search and synchronization procedures. In this case, CP correlation or reference signal correlation are used or CP correlation and reference signal correlation may be simultaneously used. Accordingly, if the CP duration used to calculate correlation is remarkably short, it may be difficult to acquire accurate timing synchronization. In addition, in actual implementation, since the CP duration is used as an important means for implementing a modem by measuring a frequency offset through correlation, guarantee of a minimum CP duration is demanded. For this reason, it is desirable to include a relatively long CP duration in a frame structure. In the present invention, the CP length of the UE is determined to be 0.5 μs or more by factoring in channel characteristics of the high frequency band.

Meanwhile, the high frequency band is characterized in that a root mean square (RMS) delay spread is shortened and thus a coherent bandwidth is increased. Since these characteristics lead to increase of a frequency band which is regarded as the same channel, a value larger than a subcarrier space of legacy LTE and cellular systems may be used as a subcarrier spacing for the high frequency band. The present invention uses the following parameters and design criteria in order to determine the subcarrier spacing for the high frequency band.

TABLE 2

| Parameter | Value |
|---|---|
| Coverage | ≤1 km |
| Operation center frequency | 20 GHz~60 GHz |
| Max. Doppler's frequency | 250 km/h@30 GHz, 125 km/h@60 GHz |
| Max. channel delay | 0.5 μs |

TABLE 2-continued

| Parameter | Value |
|---|---|
| CP overhead | ≤7% |
| Channel Bandwidth | under 500 MHz (Reference) |

The subcarrier spacing should be determined to be a size which can sufficiently reflect Doppler's frequency caused by movement of the UE. The present invention proposes design criteria represented below.

$$\left(\frac{v}{c}\right) \times f_c / \Delta f = K \text{ (where } K \ll 1\text{),} \quad \text{[Equation 4]}$$
$$\Delta f = (v * f_c)/(c * K)$$

The subcarrier spacing is determined by applying values of the maximum Doppler's frequency shown in Table 2 to Equation 4. For example, a UE speed v of 250 km/h, light speed of $c=3*10^8$ m/s, and a center frequency $f_c$ of 30 GHz may be applied to Equation 4. If K is set to $\frac{1}{15}$ which is sufficiently less than 1, a finally determined subcarrier spacing $\Delta f$ becomes 104.25 kHz. K may vary with a center frequency, a delay profile, a UE speed, and a Doppler's frequency, for frame design.

Based on the above-determined CP and subcarrier spacing, values of an OFDM symbol length, an OFDM symbol duration, overhead in terms of energy, and efficiency in terms of energy of Table 1 are determined Meanwhile, the size of a basic system bandwidth (BW) of the high frequency band is set based on a system band of 500 MHz or more. In Table 1, an FFT size, an OFDM sampling frequency, available subcarriers, an occupied BW, a guard band, and a total system BW, which are derived when the size of the basic system BW is set to 500 MHz, are determined. If the basic system BW is set to more than 500 MHz, the above values may be changed.

<TTI Based Design Method for High Frequency Frame>

The present invention proposes the following frame design methods in consideration of various implementation issues and design environments of a UE.

Suggestion 1: Memory size limitation

Suggestion 2: UE processing time limitation (while keeping 8 hybrid automatic retransmission request (HARQ) processes)

Suggestion 3: UE processing time limitation (while increasing the number of HARQ processes)

A design method according to each suggestion will now be described in more detail.

1. Frame Design Method of Suggestion 1

Figure 5:
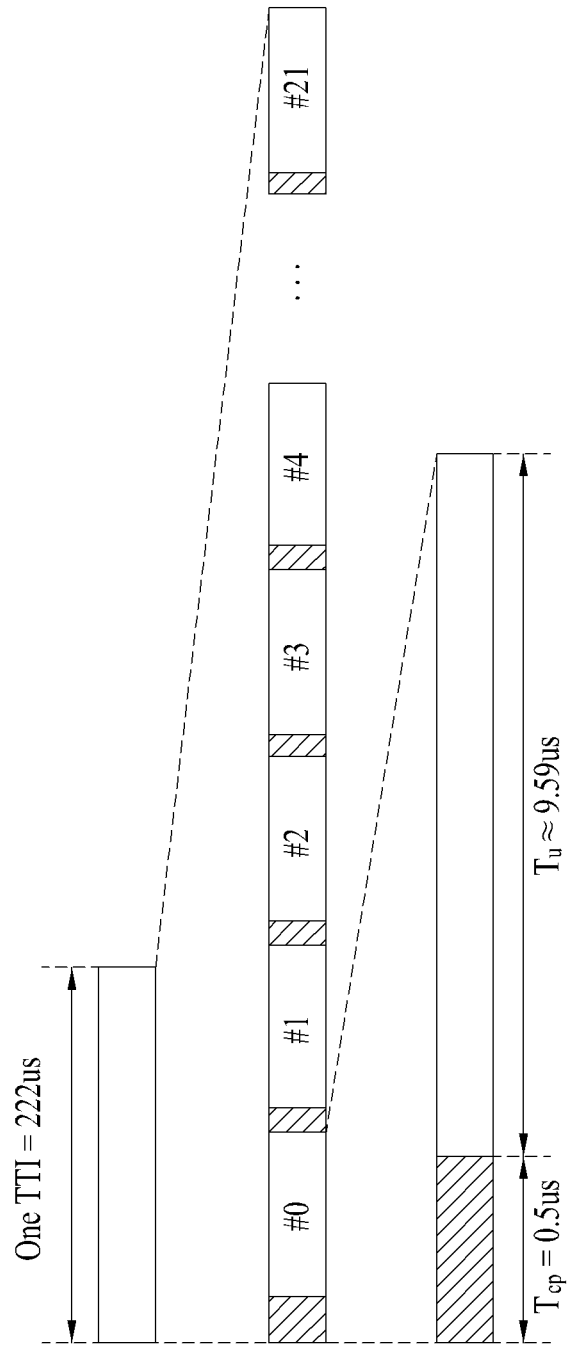
FIGS. 5 and 6 illustrate frame designs according to an embodiment of the present invention.
Figure 6:
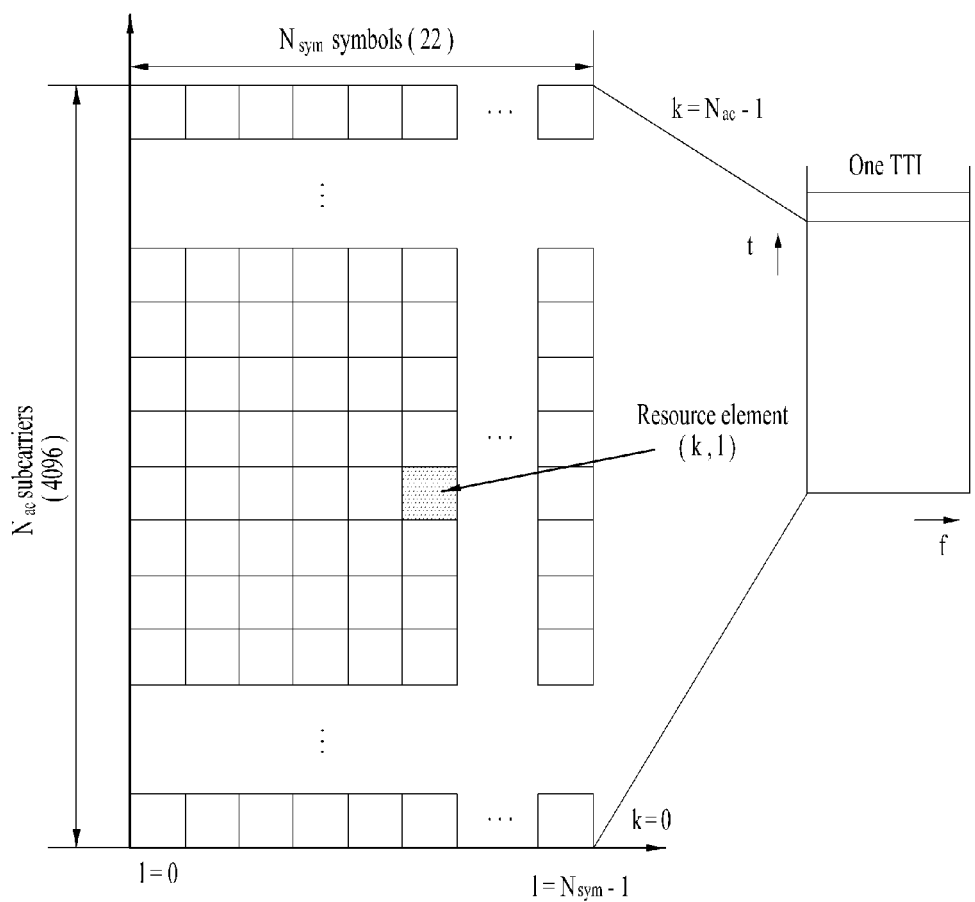

FIGS. 5 and 6 illustrate frame designs according to an embodiment of the present invention.

(1) Design conditions: memory size limitation approach (soft buffer size limitation)

(2) Assumptions: A single codeword (SCW) is assumed and the number of HARQ processes is kept at 8, which is the same as the number of HARQ processes of the legacy LTE system. A soft buffer size (or memory size) is limited to a maximum (Max.) soft buffer size as shown in Table 3. Table 3 shows a maximum size of coded bits based on the maximum soft buffer size of LTE (see 3GPP LTE 36.213).

TABLE 3

| Parameter | Value | Remarks |
| --- | --- | --- |
| Max. soft buffer | 35,982,720 | See 3GPP TS 36.306 V10.1.0 |
| Max. HARQ process No. | 8 | See 3GPP TS 36.212 V10.1.0 |
| coded bit per TB | 4,497,840 | in SCW case |

It is assumed that the service coverage of a system is 1 km or less and a round trip delay (RTT) is 6.67 μs. Therefore, a UE processing time is finally determined as follows.

$$\text{UE processing time} = 3 \times \text{TTI} - \text{RIT} \quad \text{[Equation 5]}$$

For instance, the UE processing time may be determined to be 3×TTI (0.222 us)−RTT$_{lkm}$(6.67 μs)=0.659 μs.

(3) Determined contents: Referring to Table 4 indicating TTI definition of Suggestion 1, one TTI is determined to be 222 μs corresponding to 22 final OFDM symbols. A time-axis frame structure and a resource grid according to Suggestion 1 are illustrated in FIG. 5 and FIG. 6, respectively. In the present invention, the resource grid is defined as available subcarriers in the frequency domain and a TTI in the time domain. Referring to Table 1, the number of available subcarriers in the resource grid becomes $N_{ac}$=4096 when a basic system BW is 500 MHz. According to Suggestion 1, one resource grid is expressed by 4096 subcarriers and 22 OFDM symbols. The smallest resource unit for DL or UL transmission is referred to as a resource element (RE) and one RE is composed of one subcarrier and one OFDM symbol. In other words, each element in the resource grid is referred to as an RE and the RE in each resource grid may be uniquely defined by an index pair (k, 1) where k denotes an index assigned 0 to '$N_{ac}$−1' in the frequency domain and 1 denotes an index assigned 0 to '$N_{sym}$−1' in the time domain.

TABLE 4

| Parameter | Value | Remarks |
| --- | --- | --- |
| RE per OFDM symbol | 4,096 | Use full subcarriers. |
| Layer | 8 | Assume max. 8 layers. |
| Modulation | 8 | Assume 256 quadrature amplitude modulation (QAM) support |
| Overhead (%) | 25 | Apply overhead considered when calculating LTE link budget: LTE peak data rate: resource element (RE) overhead required for transmission of 8 layers Total 42 REs: 12 REs (for physical downlink control channel (PDCCH)), 6 REs (for cell specific reference signal (CRS)), 24 REs (for demodulation reference signal (DMRS)) Overhead = 42/168 = 25% |
| No. of OFDM symbol ($N_{sym}$) per TTI | 22 symbols | In SCW case |
| One TTI | 222 μs | |

Figure 7:
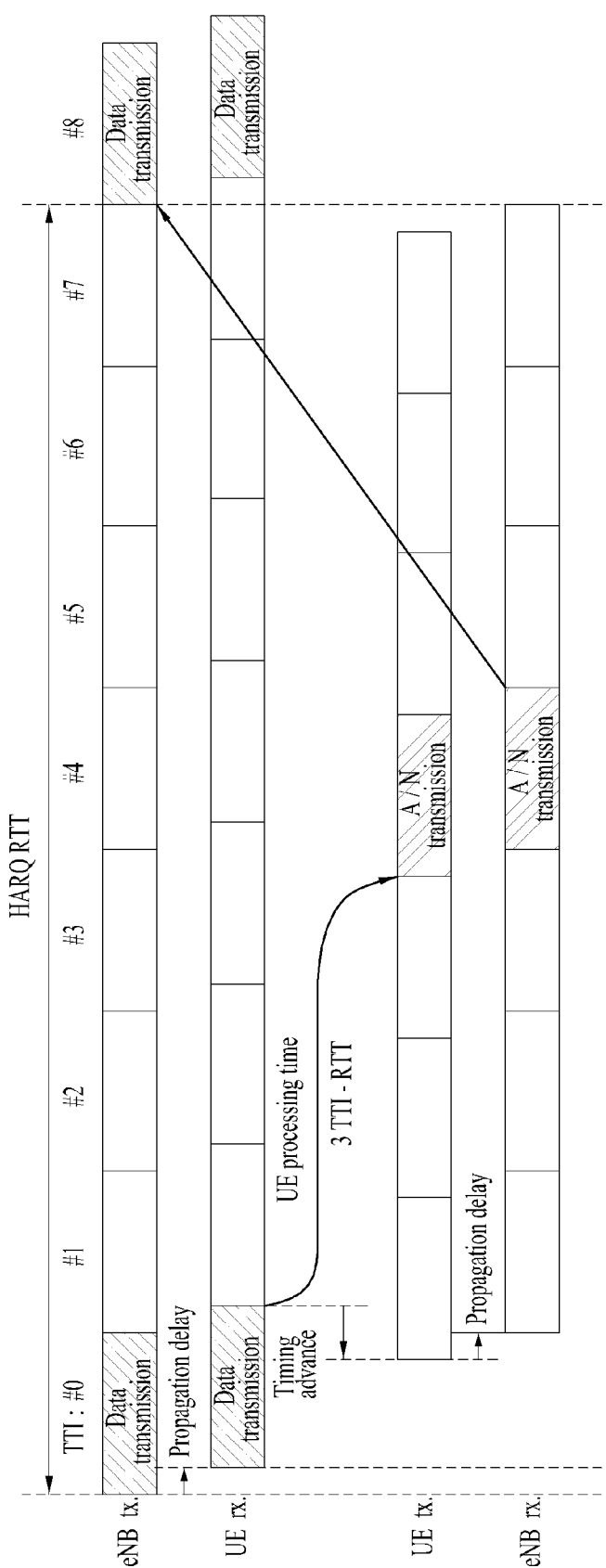
FIG. 7 illustrates a stop-and-wait (SAW) HARQ process according to an embodiment of the present invention.

8 HARQ processes according to Suggestion 1 are determined as illustrated in FIG. 7. FIG. 7 illustrates a stop-and-wait (SAW) HARQ process according to an embodiment (Suggestion 1) of the present invention. Referring to FIG. 7, data transmitted by an eNB in TTI #0 is received in TTI #0 after a propagation delay. The UE attempts to decode the data to perform acknowledgement/negative acknowledgement (A/N) transmission for data transmission in TTI #4 which is after 4 TTIs elapse. A/N for the data is received by the eNB in TTI #4 after a propagation delay. Since the 4 TTIs are remarkably greater than 0.659 μs which is '3TTI-RTT' corresponding to a processing time determined according to Suggestion 1, the UE can effectively transmit a signal for A/N transmission. The eNB can be aware of whether the UE has successfully received the data transmitted in TTI #0 based on A/N transmission. If the UE has successfully received the data, the eNB may transmit new data starting from TTI #8 which is after 4 TTIs elapse from TTI #4. If the UE has failed to receive the data, the eNB may perform data retransmission.

Meanwhile, Table 5 shows definition of maximum transmission block (TB) size according to Suggestion 1.

TABLE 5

| Parameter | Value | Remarks |
| --- | --- | --- |
| Max. TB size per (a TB per CC) | 299,856 | In multiple codeword (MCW) case of LTE-A (3GPP TS 36.213 V10.1.0) |
| Max. coded bit per a TB | 449,784 | In MCW case of LTE-A (3GPP TS 36.213 V10.1.0) |
| Supported coding rate range | ≥0.67 | In LTE, used as reference |
| Max. code bit size | 4,497,840 | In SCW case |
| Supported coding rate range | ≥0.67 | Same definition as coding rate range of LTE |
| Max. TB size | ≤2,998,580 | In SCW case |

2. Frame Design Method of Suggestion 2

(1) Design conditions: Medium access control (MAC)/physical (PHY) process limitation (UE processing time)

(2) Assumptions: An SCW is assumed and the number of HARQ processes is kept at 8, which is the same as the number of HARQ processes of the legacy LTE system. Similarly to Suggestion 1, it is assumed that the service coverage of a system is 1 km or less and an RTT is 6.67 μs. Notably, it is assumed that a UE processing time of Suggestion 2 is 2.3 ms.

Figure 8:
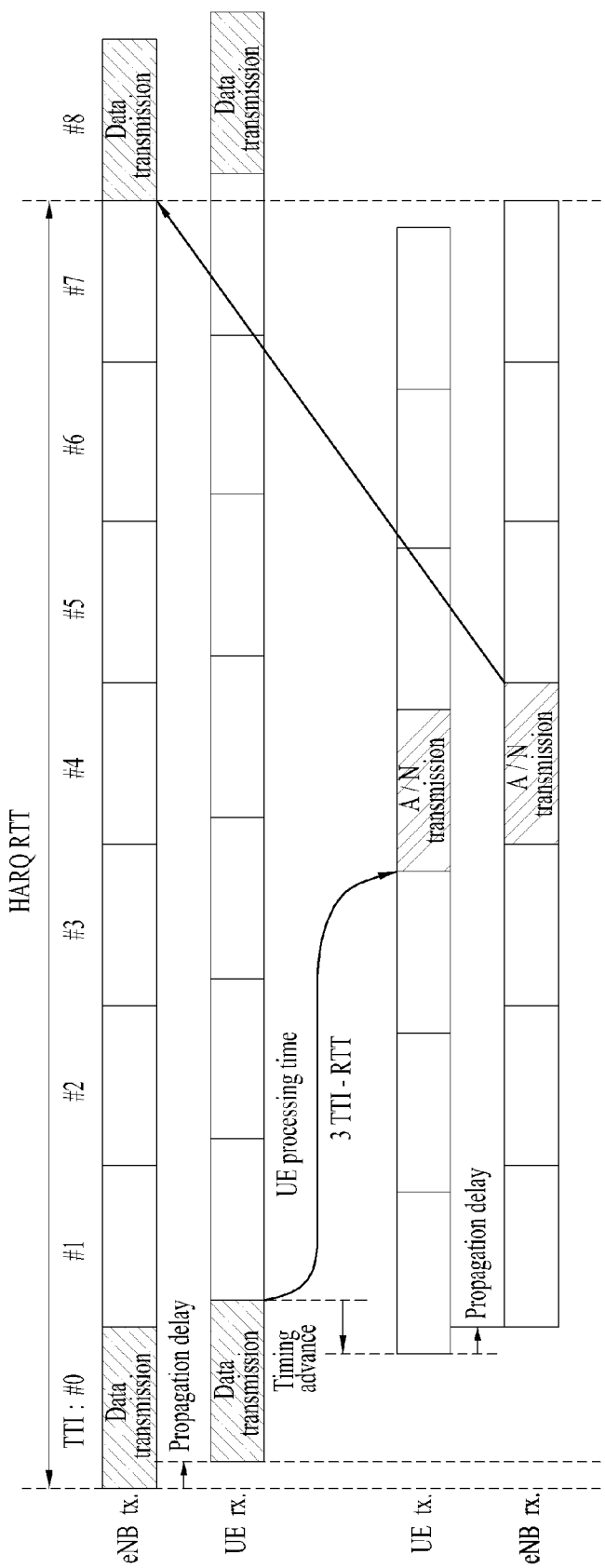
FIG. 8 illustrates an SAW HARQ process according to another embodiment of the present invention.

(3) Determined contents: A TTI is determined to be 767.6 μs which is a duration corresponding to 76 final OFDM symbols. FIG. 8 illustrates an SAW HARQ process according to another embodiment (Suggestion 2) of the present invention. 8 HARQ processes of Suggestion 2 are determined as illustrated in FIG. 8. In FIG. 8, one TTI corresponds to 767 μs. Accordingly, a final TB size needs to be increased about 3.45 times a TB size of the legacy LTE system.

3. Frame Design Method of Suggestion 3

(1) Design conditions: MAC/PHY process limitation (while increasing the number of HARQ processes)

(2) Assumptions: An SCW is assumed. It is assumed that the service coverage of a system is 1 km or less and an RTT is 6.67 μs. Notably, it is assumed that a UE processing time is 2.3 ms and one TTI is 222 μs which is a duration corresponding to 22 OFDM symbols.

Figure 9:
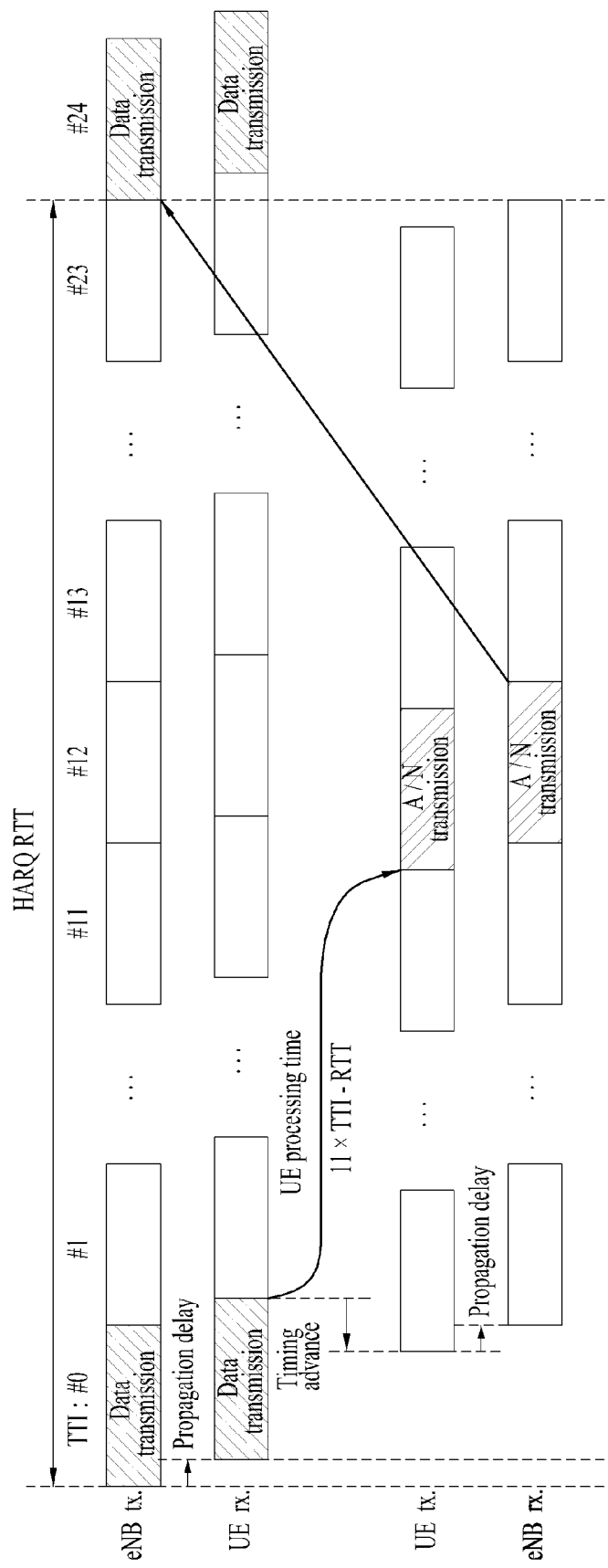
FIG. 9 illustrates an SAW HARQ process according to still another embodiment of the present invention.

(3) Determined contents: A TTI is 222 μs corresponding to 22 final OFDM symbols which is the same as the value in Suggestion 1. However, the number of HARQ processes is increased to 24 as illustrated in FIG. 9. FIG. 9 illustrates an SAW HARQ process according to still another embodiment (Suggestion 3) of the present invention.

Parameters of an OFDM based high frequency frame determined according to the above described Suggestion 1 to Suggestion 3 are summarized as follows.

TABLE 6

| Parameter | LTE (Normal CP) | Suggestion 1 | Suggestion 2 | Suggestion 3 |
|---|---|---|---|---|
| Subcarrier-spacing | 15 kHz | | 104.25 kHz | |
| OFDM symbol period | 66.67 μs | | 9.59 μs | |
| Guard Interval/Cyclic Prefix | 4.7 μs | | 0.5 μs | |
| OFDM symbol duration | 71.14 μs | | 10.09 μs | |
| Efficiency in terms of energy | 94.1% | | 95% | |
| Occupied BW | 90 MHz (5 CCs) | | 427.008 MHz | |
| Guard-band | 10 MHz (5 CCs) | | 47.445 MHz | |
| Total System BW | 100 MHz | | 474.453 MHz | |
| No. of available subcarriers | 6,000 (5 CCs) | | 4096 | |
| Number of OFDM symbol ($N_{sym}$) per TTI | 14 symbols | 22 | 76 | 22 (assume) |
| TTI duration | 1 ms | 222 μs | 767 μs | 222 μs |
| HARQ process number | 8 | 8 | 8 | 24 |
| UE processing time | 2.3 ms | 0.666 ms | 2.3 ms | 2.3 ms |
| Total soft buffer size | $N_{SB}$ = 35,982,720 | $N_{SB}$ | $N_{SB}$ × 3.45 | $N_{SB}$ × 3 |

<Flexible Frame Structure>

The present invention proposes configuring a flexible frame in consideration of the Doppler effect of a UE or a link. Hereinafter, flexible frame configuration methods will be described with reference to FIGS. 10 to 17. In proposals described below, the frame structures according to the above-described frame designs may be used. An eNB may configure a proper frame type or subframe type according to the state of UE(s) or a link in consideration of the Doppler effect. If frame configuration is changed, subframe or TTI configuration in a corresponding frame is also changed according to the changed frame configuration. UE(s) that are to access the eNB or UE(s) connected to the eNB may configure frame(s) or subframe(s) for communication with the eNB based on link configuration information or frame configuration information transmitted by the eNB through a higher layer (e.g. MAC layer or RRC layer) signal. The link configuration information or frame configuration information according to the present invention may be information indicating that a frame structure type is changed according to one of embodiments of the present invention which will be described later. The information indicating that the frame structure type is changed may be information indicating one of a plurality of predefined frame structures or may be information indicating change of parameter(s) which may mean change of a frame structure according to one of the embodiments of the present invention, wherein the parameter(s) may be, for example, an (effective) subcarrier spacing, a sampling time, the number of samples, the number of OFDM symbols, and/or an FFT size.

The embodiments described with reference to Table 1 to Table 6 may be used for any one of frame structures applied to a flexible frame. For example, a CP length, a subcarrier spacing, the number of OFDM symbols per TTI, a TTI length, etc., which are determined according to any one of the above-described embodiments of the present invention, may be used as any one of a plurality of frame structures used in the flexible frame of the present invention.

As described above, a center frequency increases in a high frequency band. A maximum Doppler's frequency $f_{d,max}$ is defined by the following equation.

$$f_{d,max} = \frac{v}{c} \times f_c \quad \text{[Equation 6]}$$

Referring to Equation 6, it can be appreciated that the Doppler's frequency $f_{d,max}$ increases as a center frequency $f_c$ increases. If the Doppler's frequency increases, orthogonality between subcarriers of the frequency domain is destroyed and thus the probability of deteriorating system performance increases. The Doppler's frequency may be reduced by greatly increasing a subcarrier spacing during OFDM based subframe design. However, increase of the subcarrier spacing shortens a symbol period of the time domain and thus more reference signals for channel estimation in the time domain are demanded, resulting in system loss. On the contrary, if the symbol period of the time domain increases, the subcarrier spacing of the frequency domain is reduced and orthogonality between subcarriers is destroyed by the Doppler's frequency. However, since a frame structure cannot be frequently changed during system design once it is determined, the frame structure has no flexibility and is designed such that only a minimum change is always accommodated. Therefore, the present invention proposes a flexible frame configuration method for overcoming the Doppler's frequency in a high frequency band transmission environment in which a channel state may be remarkably changed according to the mobile speed of the UE.

For reference, embodiments for flexible frame configuration according to the present invention will be described hereinbelow by referring to a frame structure for a link or UE(s) having a less Doppler effect as frame structure type-A and a frame structure for a link or UE(s) having a great Doppler effect as frame structure type-B. Although the embodiments of the present invention will be described hereinbelow under the assumption that two frame structure types are defined according to the Doppler's frequency, it is possible to predefine more than two frame structure types according to the influence of the Doppler's frequency.

In configuring a flexible frame described below, any one of multiple frame structure types may be predetermined to be used during initial access. For example, the UE may attempt to access the eNB under the assumption that a frame is configured according to a predetermined frame structure, i.e. frame configuration, upon attempting to access the eNB.

If the UE fails to attempt to access the eNB according to the predetermined frame structure, the UE may attempt to access the eNB again using another frame structure. In the present invention, an (effective) subcarrier spacing etc. may be determined according to a frame structure. That is, if an (effective) subcarrier spacing etc. differs, a frame structure may also differ.

Proposal 1) The eNB may directly change the subcarrier spacing of a frame according to change of the Doppler's frequency on a link. That is, in Proposal 1 of the present invention, the frame structure may be changed by changing an actual subcarrier spacing.

Figure 10:
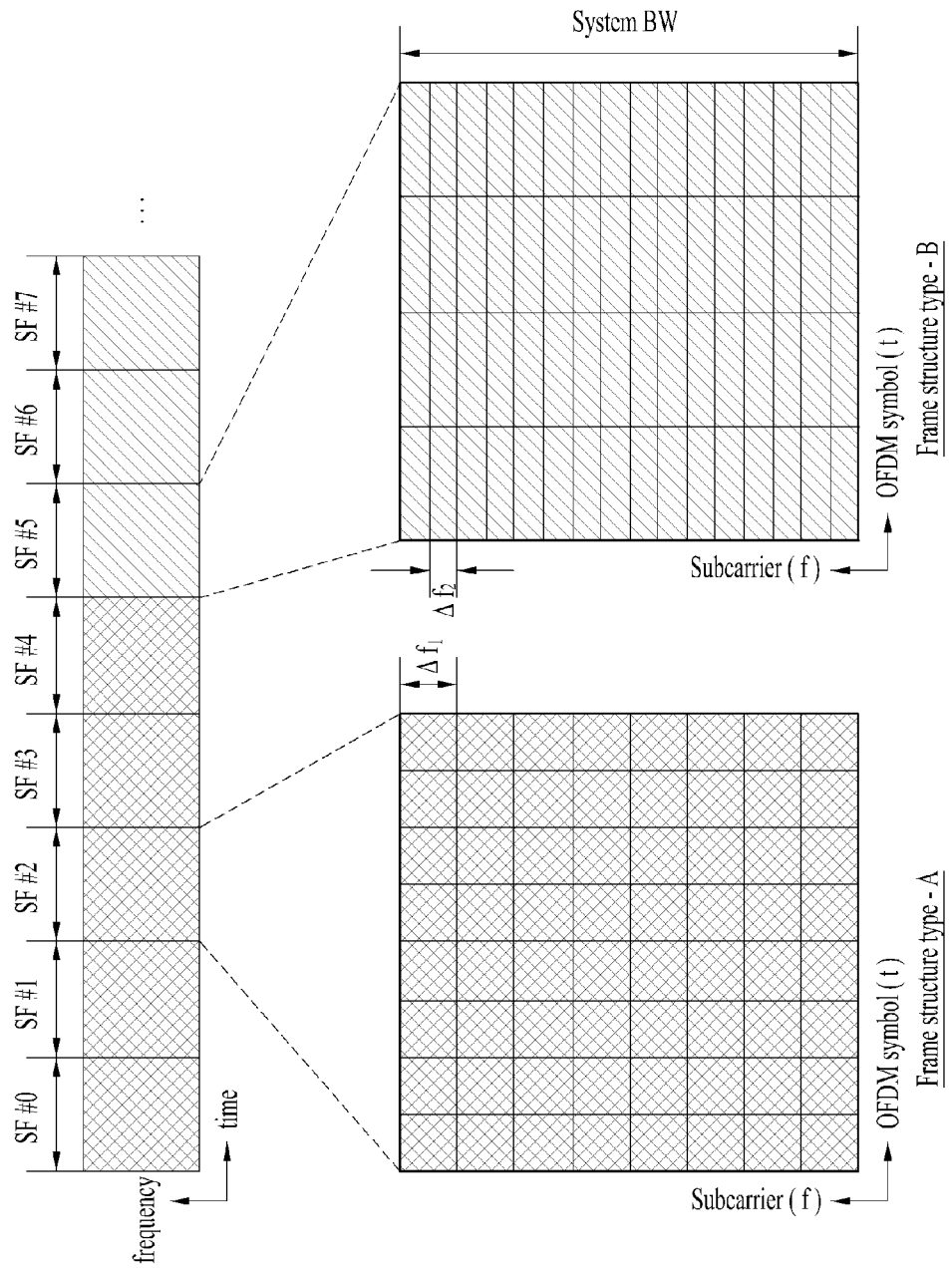
FIGS. 10 and 11 are diagrams for explaining an example of configuring a flexible frame according to an embodiment of the present invention.
Figure 11:
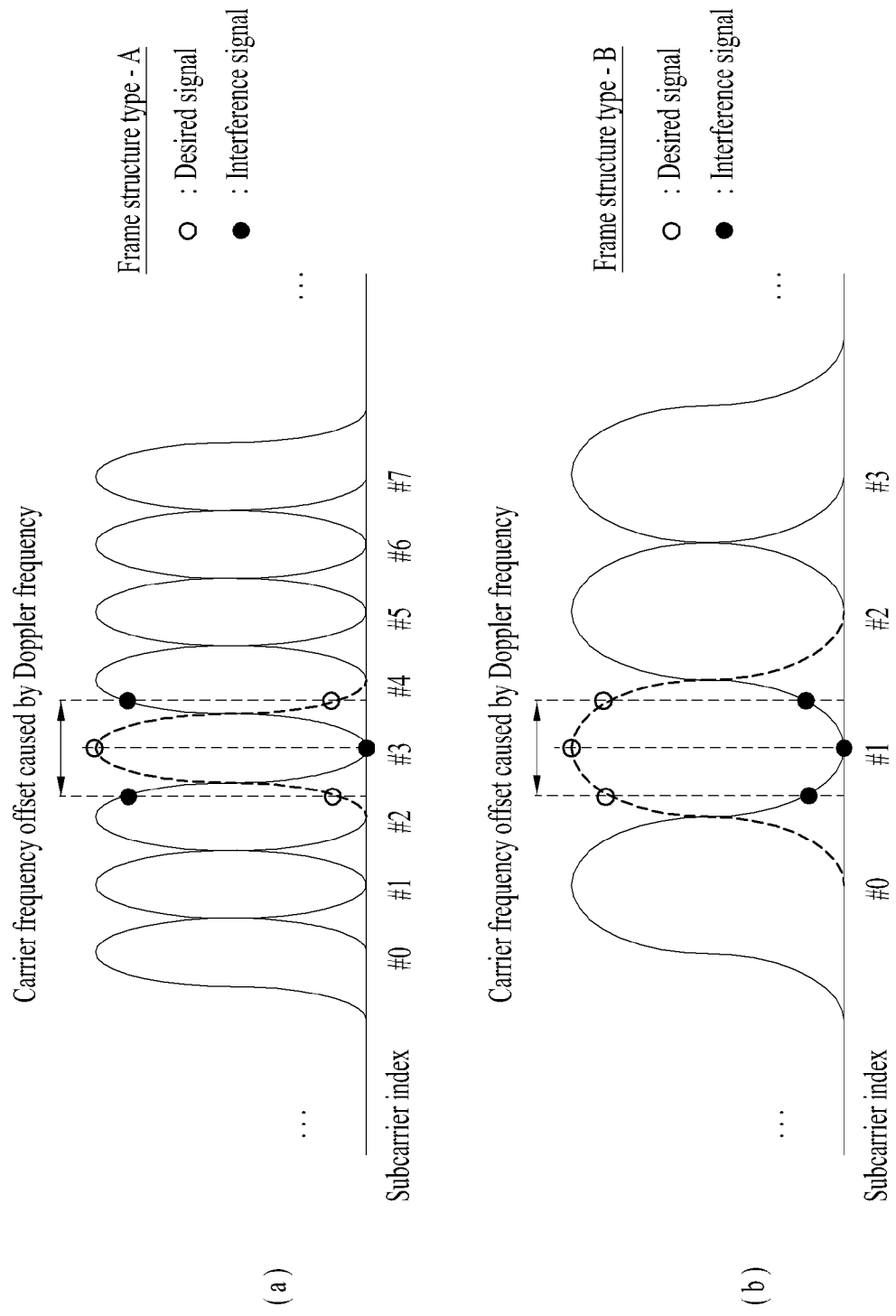

FIGS. 10 and 11 are diagrams for explaining an example of configuring a flexible frame according to an embodiment of the present invention.

Referring to FIG. 10, the present invention changes a subcarrier spacing according to a link situation while maintaining a TTI and a system BW constituting a basic structure of a frame and configures a frame structure suitable for the changed subcarrier spacing.

If the ratio of UEs having a high Doppler's frequency in a cell, i.e. the ratio of UEs moving at a high speed, is above a reference value or if there is a high-speed movement backhaul support as in a high-speed train, flexible switching of the frame structure can be performed.

In Proposal 1 of the present invention, a subcarrier spacing is changed directly, i.e. substantially, in the frequency domain of the frame as illustrated in FIG. 10. As an example, referring to FIG. 10, if the Doppler's frequency increases, the present invention increases the subcarrier spacing from $\Delta f_1$ to $\Delta f_2$.

FIG. 11 is a diagram comparing an influence degree of a center frequency offset (CFO) according to a subcarrier spacing in a situation in which a CFO caused by the same Doppler's frequency occurs.

If the subcarrier spacing increases, the CFO may be reduced due to increase of the Doppler's frequency. The principle of reducing the CFO caused by increase of the subcarrier spacing will now be described in more detail. If each subcarrier of OFDM is sampled at a subcarrier index location point, since a signal of another subcarrier is zero-crossed, a signal of a dedicated subcarrier is accurately detected. However, referring to FIG. 11(a), if the Doppler's frequency increases, the CFO also increases and it is difficult to accurately detect a signal at a zero-cross point between subcarriers. That is, referring to FIG. 11(a), since the zero-cross point at which a signal should be detected is not located at the top of a sine curve and swings within a CFO range caused by the Doppler's frequency, it is difficult to accurately detect a signal. For example, when the zero-cross point maximally swings, since the strength of a desired signal becomes weaker than the strength of a neighboring subcarrier signal which functions as an interference signal with respect to the desired signal, signal detection performance can be greatly deteriorated. If it is difficult to distinguish between subcarriers because neighboring subcarriers function as mutual interference, it is said that orthogonality of subcarriers has been destroyed. However, if the subcarrier spacing increases as illustrated in FIG. 11(b), the distance between subcarriers increases even though the zero-cross point swings and thus destruction of orthogonality may be relieved. Consequently, the effect of a frequency offset caused by the Doppler's frequency during a given duration is reduced through frame structure configuration in which the subcarrier spacing is increased.

It is noted that the subframe spacing of the frame is associated with a sampling frequency/period of the time domain. Hereinafter, Proposal 1-1 and Proposal 1-2 of the present invention in association with the sampling frequency/period will be described.

Proposal 1-1) To configure a flexible frame, only the subcarrier spacing is changed and the same sampling frequency/period is used in the time domain.

Prior to description of Proposal 1-1 of the present invention, the relationship between the sampling frequency/period and the subcarrier spacing will be described first. A sampling frequency $f_s$ and a period $T_s$ have an inverse relationship as indicated by Equation 7 and the sampling frequency $f_s$ and a subcarrier spacing $\Delta f$ have a relationship as indicated by Equation 8.

$$T_s = 1/f_s \quad \text{[Equation 7]}$$

$$f_s = \Delta f \times \text{FFT}_{size} = \text{BW}_{max} \quad \text{[Equation 8]}$$

In Equation 8, $\text{BW}_{max}$ denotes a system BW and $\text{FFT}_{size}$ denotes the size of FFT. $\text{FFT}_{size}$ affects the number of subcarriers. If the subcarrier spacing $\Delta f$ corresponding to the size of one subcarrier is multiplied by the number $\text{FFT}_{size}$ of subcarriers, a total transmission BW may be obtained.

According to Proposal 1-1 of the present invention, only the subcarrier spacing is changed for flexible frame configuration and a BW and a sampling period are maintained. Since the sampling period $T_s$ is fixed, the sampling frequency $f_s$ is also fixed. That is, if the subcarrier spacing is increased or decreased, $\text{FFT}_{size}$ is decreased or increased to maintain the sampling frequency. For example, if the subcarrier spacing $\Delta f$ is doubled from 100 kHz to 200 kHz, this means that the FFT size is reduced ½ times from 2048 to 1024 and an OFDM symbol period of the time domain is reduced ½ times. Namely, if the subcarrier spacing is changed by 'x' times, an OFDM symbol duration is reduced by '1/x' times. Accordingly, OFDM symbols are doubled in the same TTI of the frame structure.

Therefore, in order to configure the flexible frame according to Proposal 1-1 of the present invention, a transmitting end and a receiving end should include respective FFT blocks each having a size inversely proportional to each subcarrier spacing. That is, the transmitting end and the receiving end should include or should be capable of configuring an FFT block per subcarrier spacing.

Figure 12:
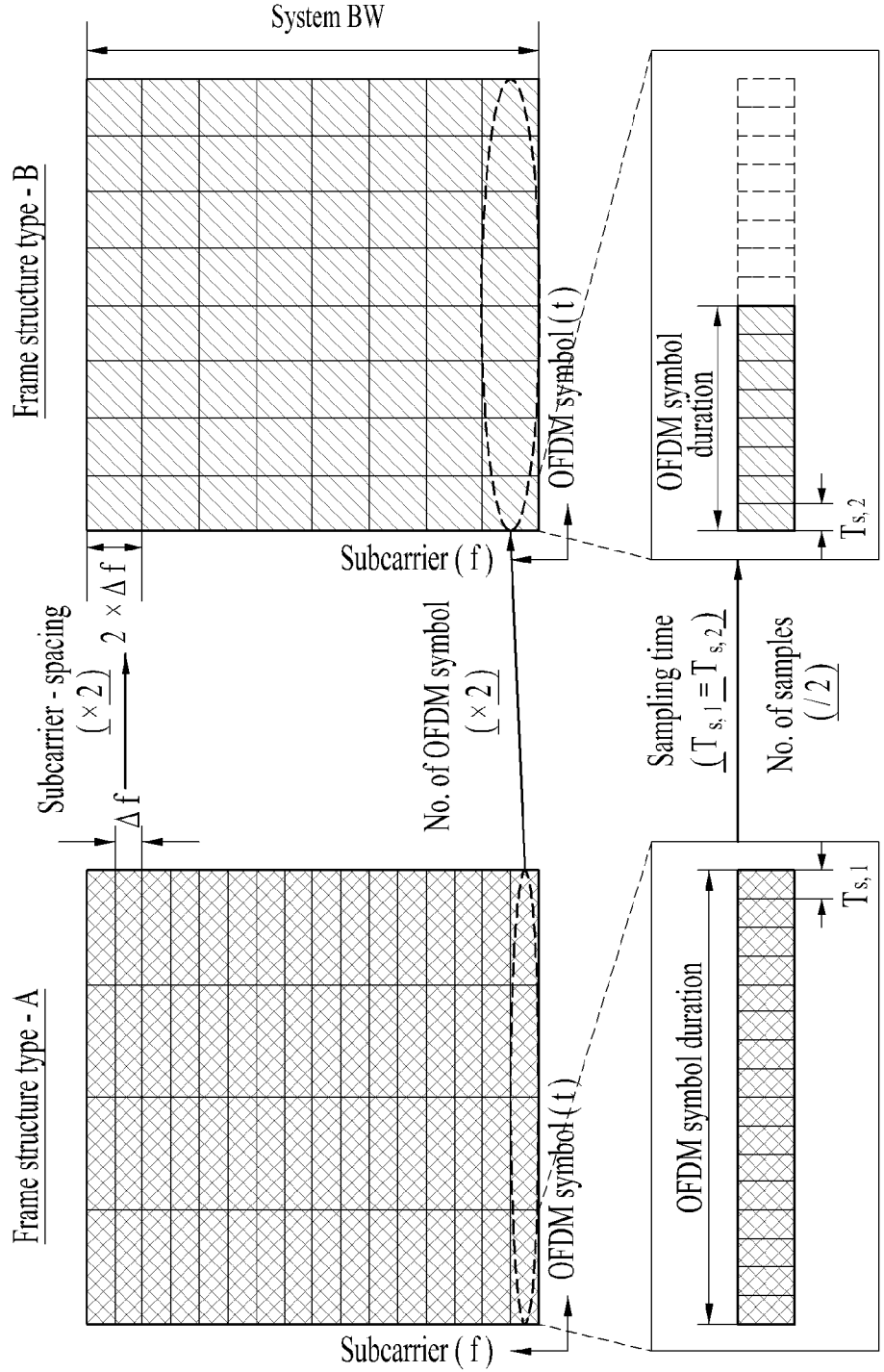
FIG. 12 illustrates an example of a flexible frame structure according to an embodiment of the present invention.

FIG. 12 illustrates an example of a flexible frame structure according to an embodiment of the present invention. Particularly, FIG. 12 illustrates an example of changing a frame structure according to Proposal 1-1 of the present invention in the case in which a subcarrier spacing is doubled.

If the subcarrier size or FFT size is reduced, an OFDM symbol period $T_{sym} = T_{CP} + T_u$ ($= \text{FFT}_{size} \cdot T_s$) is also reduced. Therefore, when the subcarrier spacing is doubled, the number of OFDM symbols in the frame structure is doubled. For example, according to Proposal 1-1 of the present invention, when the subcarrier spacing is increased from $\Delta f_1 = \Delta f$ to $\Delta f_2 = 2 \cdot \Delta f$ the frame structure may be changed from frame structure type-A to frame structure type-B as illustrated in FIG. 12. Referring to FIG. 12, although the subcarrier spacing is changed according to Proposal 1 of the present invention, a sampling time, i.e. a sampling period $T_{s,1}$, of frame structure type-A before the subcarrier spacing is changed and a sampling time $T_{s,2}$ of frame structure type-B after the subcarrier spacing is changed are identically maintained according to Proposal 1-1 of the present invention. However, the number of samples is changed to 1/(42/41). In FIG. 12, the number of samples, 1/(2/1), is reduced ½ after change of the subframe space as compared with the number of samples prior to change of the subcarrier spacing.

Proposal 1-2) To configure the flexible frame, the subcarrier spacing is changed and simultaneously a sampling time/frequency of the time domain and the frequency domain is also changed.

Figure 13:
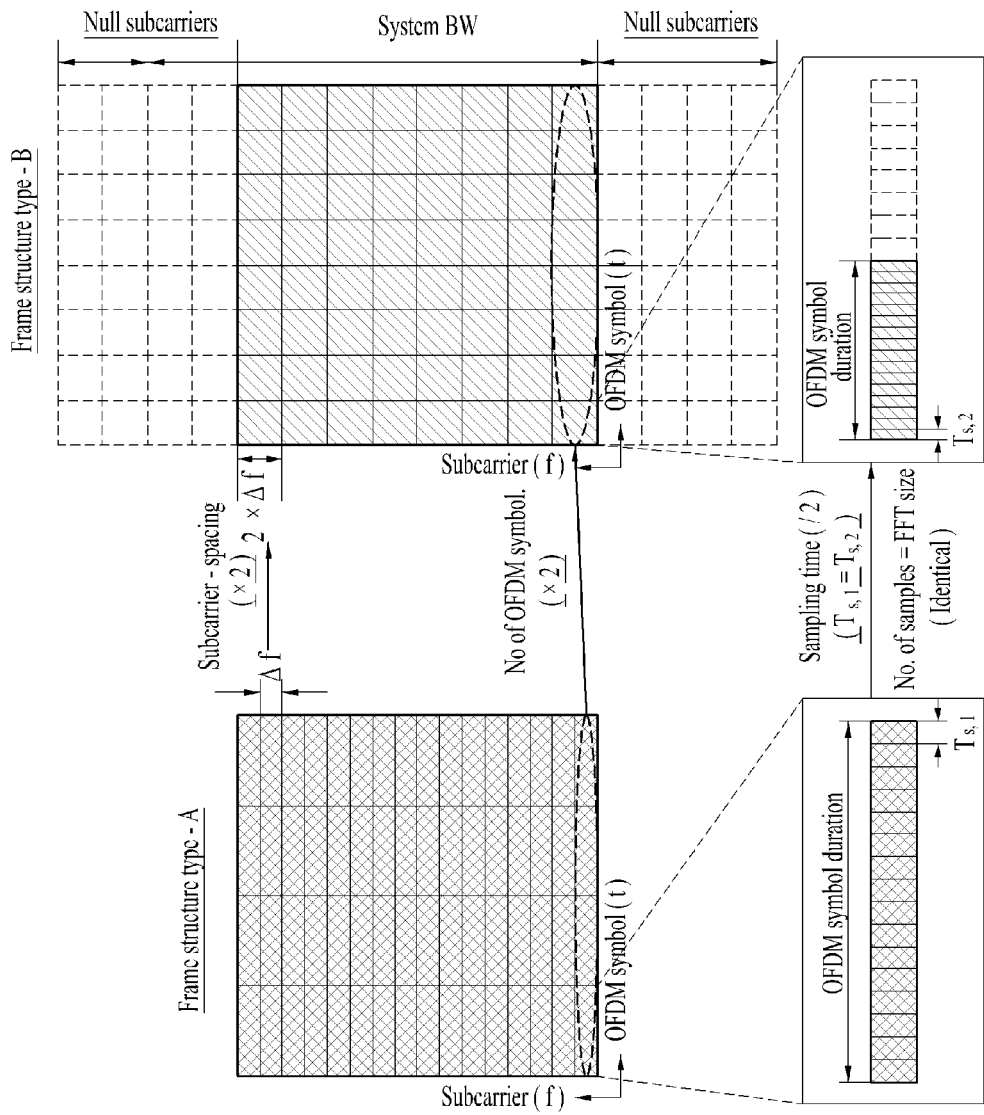
FIG. 13 illustrates another example of a flexible frame structure according to an embodiment of the present invention.

FIG. 13 illustrates another example of a flexible frame structure according to an embodiment of the present invention. Particularly, FIG. 13 illustrates an example of changing a frame structure according to Proposal 1-2 of the present invention in the case in which a subcarrier spacing is doubled.

Unlike Proposal 1-1, in Proposal 1-2 of the present invention, a subcarrier spacing and a sampling period are simultaneously changed for flexible frame configuration. For example, according to Proposal 1-2 of the present invention, if the subcarrier spacing increases, the sampling frequency $f_s$ increases and the sampling period $T_s$ is shortened. However, an FFT size is maintained even though the subcarrier spacing is changed. For this reason, the transmitting end and the receiving end may use FFT blocks of one size.

For instance, if the subcarrier spacing $\Delta f$ is doubled from 100 kHz to 200 kHz, the sampling frequency is doubled and the sampling period is reduced ½ times. In Proposal 1-2 of the present invention, the relationship of Equation 8 is changed as follows as opposed to Proposal 1-1 of the present invention.

$$f_s = \Delta f \times FFT_{size} \neq BW_{max}$$ [Equation 9]

If the same FFT size is applied irrespective of the subcarrier spacing, it can be appreciated from Equation 8 that the system BW is also changed. Since an available system BW in a specific center frequency usable for an eNB or a UE is always the same as opposed to a frame structure which may differ according to configuration, a system BW, which is changed according to variation of the subcarrier spacing, cannot be applied without change. Namely, even if the subcarrier spacing is changed, an effective system BW should be maintained. Consequently, a method for compensating for the difference between the effective system BW and $BW_{max}$ caused by $f_s = \Delta f \times FFT_{size}$ is needed. The present invention uses a null subcarrier to compensate for the difference between the effective system BW and $BW_{max}$ caused by $f_s = \Delta f \times FFT_{size}$. The null subcarrier refers to a subcarrier, power of which is '0' so that it is called a zero subcarrier or zero-power subcarrier. Hereinafter, to distinguish a subcarrier, a transmit power of which is not '0' from the null subcarrier, the former is referred to as a nonzero subcarrier or a nonzero-power subcarrier. The transmitting end transmits a subcarrier corresponding to the null subcarrier by setting a transmit power to '0'. Then the receiving end performs reception, rate matching, decoding, or demodulation of a signal under the assumption that the transmit power of the subcarrier corresponding to the null subcarrier is '0'.

In the present invention, in order to compensate for the difference between a changed system BW according to increase of the subcarrier spacing and an originally determined basic system BW, i.e. an effective system BW, the increased system BW according to increase of the subcarrier spacing is maintained by allocating null subcarrier(s) to both sides of the effective system BW subcarriers with respect to a band exceeding the effective system BW. That is, if the system BW $BW_{max}$ according to the subcarrier spacing is greater than the effective system BW of a corresponding frequency band, subcarriers corresponding to the difference between $BW_{max}$ calculated according to the subcarrier spacing and the effective system BW are set to null subcarriers, wherein subcarriers separated farthest from the center of the corresponding frequency band are set to the null subcarriers.

Assuming that the total number of subcarriers within a BW corresponding to the difference between the system BW $BW_{max}$ according to the subcarrier space and the effective system BW of a corresponding frequency band is X, for an even-numbered X, X/2 subcarrier(s) having the smallest subcarrier index and X/2 subcarrier(s) having the largest subcarrier index are set to null subcarriers. For example, referring to FIG. 13, when the effective system BW is $\Delta f \times FFT_{size}$, if the subcarrier spacing is increased to $2 \cdot \Delta f$, subcarriers corresponding to ¼ of each of both ends among all subcarriers based on an FFT size are defined as null subcarriers. Resource allocation is not performed upon the null subcarriers. For an odd-numbered X, 'ceiling(X/2)' subcarrier(s) having the largest subcarrier index and 'ceiling(X/2)−1' subcarrier(s) having the smallest subcarrier index may be set to null subcarriers or 'ceiling(X/2)−1' subcarrier(s) having the largest subcarrier index and 'ceiling(X/2)' subcarrier(s) having the smallest subcarrier index may be set to the null subcarriers.

Meanwhile, a flexible frame configuration method according to Proposal 1-2 of the present invention simultaneously changes the sampling period $T_s$ together with the subcarrier spacing and the ODFM symbol period according to change of the frame structure. For instance, referring to FIG. 13, since the FFT size is identically maintained although the subcarrier spacing is doubled, the sampling frequency is doubled and then the OFDM symbol period $T_s$ is reduced ½ times. Therefore, the number of OFDM symbols included in the same duration (e.g. TTI) is doubled.

Proposal 2) The eNB changes an effective subcarrier spacing without changing a subcarrier spacing of a frame according to change of the Doppler's frequency on a link.

Proposal 2 of the present invention provides a flexible frame structure configuration method according to change of the Doppler's frequency without changing a basic subcarrier spacing and a symbol period of a frame, an FFT size, etc. According to Proposal 2 of the present invention, an additional frame may be configured for each UE as opposed to Proposal 1 of the present invention described above. However, in order to provide robustness for overcoming Doppler effect of a UE, there is a trade-off relationship between overcoming Doppler effect of UE and transmission efficiency because robustness for overcoming Doppler effect of each UE is related to reduction in transmission efficiency. The principle of Proposal 1-2 of the present invention will be described in brief.

Increase of the Doppler's frequency causes performance deterioration by destroying orthogonality between subcarriers as described above. Since Proposal 2 of the present invention does not change the subcarrier spacing $\Delta f$, the probability of causing substantial interference between subcarriers is not changed. Notably, Proposal 2 of the present invention lowers the degree of interference between subcarriers by inserting a null subcarrier between specific subcarriers and thus widening an effective subcarrier spacing. That is, Proposal 2 of the present invention increases the effective subcarrier spacing by alternately configuring nonzero-power subcarriers and N (≥0) consecutive zero-power subcarrier(s) along a frequency axis (i.e. in the frequency domain). Namely, in Proposal 2 of the present invention, a nonzero subcarrier is configured in every (N+1) subcarriers along the frequency axis among predetermined subcarriers of the frequency domain and zero-power subcarriers are configured in the other subcarriers. According to Proposal 2 of the present invention, since a nonzero-power subcarrier spacing is 'N+1' times a basic subcarrier spacing Δf, an effect such that the effective subcarrier spacing becomes (N+1)·Δf is obtained. Here, N denotes the number of zero-power subcarriers between two adjacent nonzero-power subcarriers.

The effective subcarrier spacing or the number of inserted null subcarriers may be determined in association with the size of the Doppler's frequency. For example, the number of inserted null subcarriers may be determined by the ratio '$f_{d,2}/f_{d,1}$' of a Doppler's frequency $f_{d,1}$ assumed in a frame structure which does not require insertion of a null subcarrier to a Doppler's frequency $f_{d,2}$ of a frame structure needed to insert a null subcarrier or may be determined by multiplication of '$f_{d,2}/f_{d,1}$' and a weight a (where a is positive real number or a positive integer).

Figure 14:
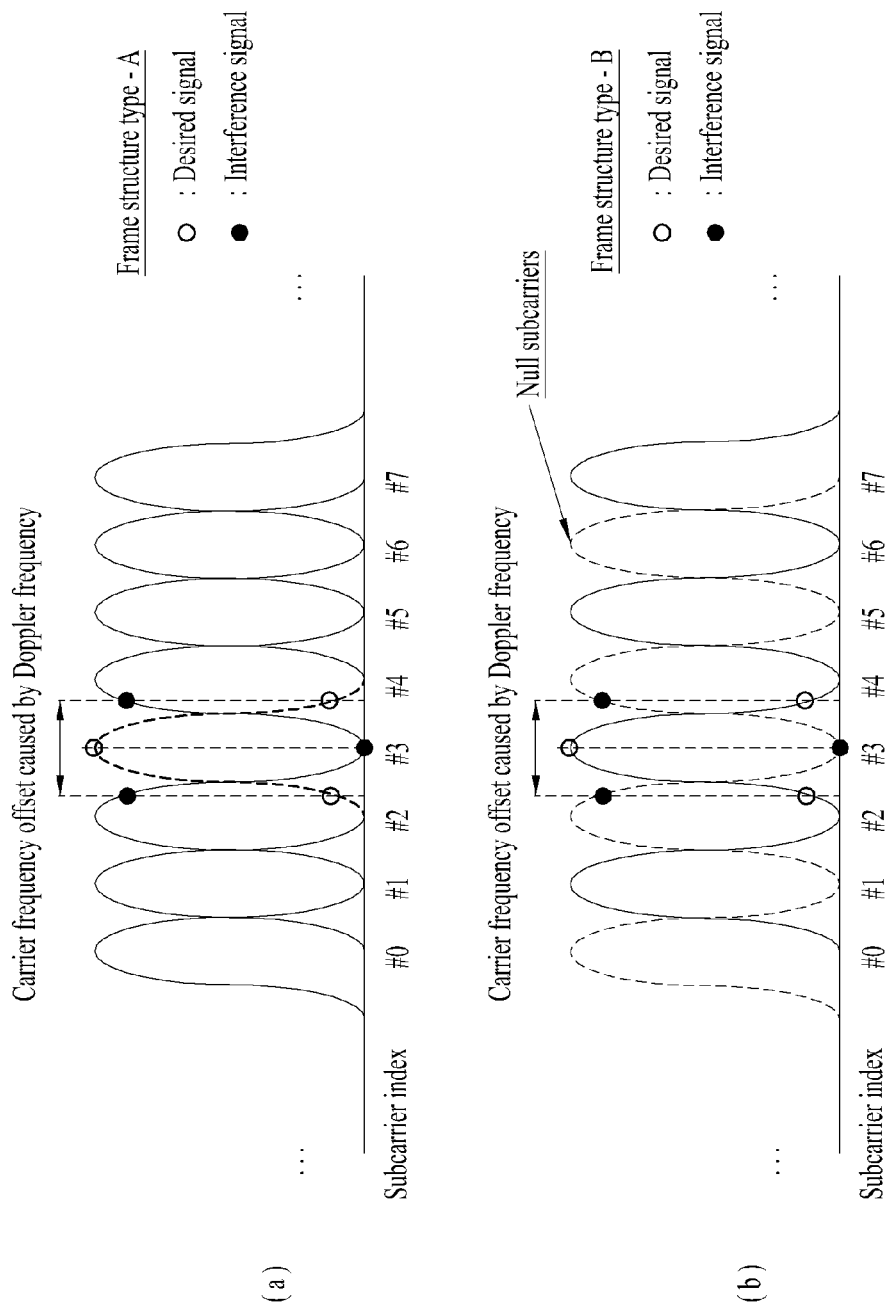
FIGS. 14 and 15 are diagrams for explaining an example of configuring a flexible frame according to another embodiment of the present invention.
Figure 15:
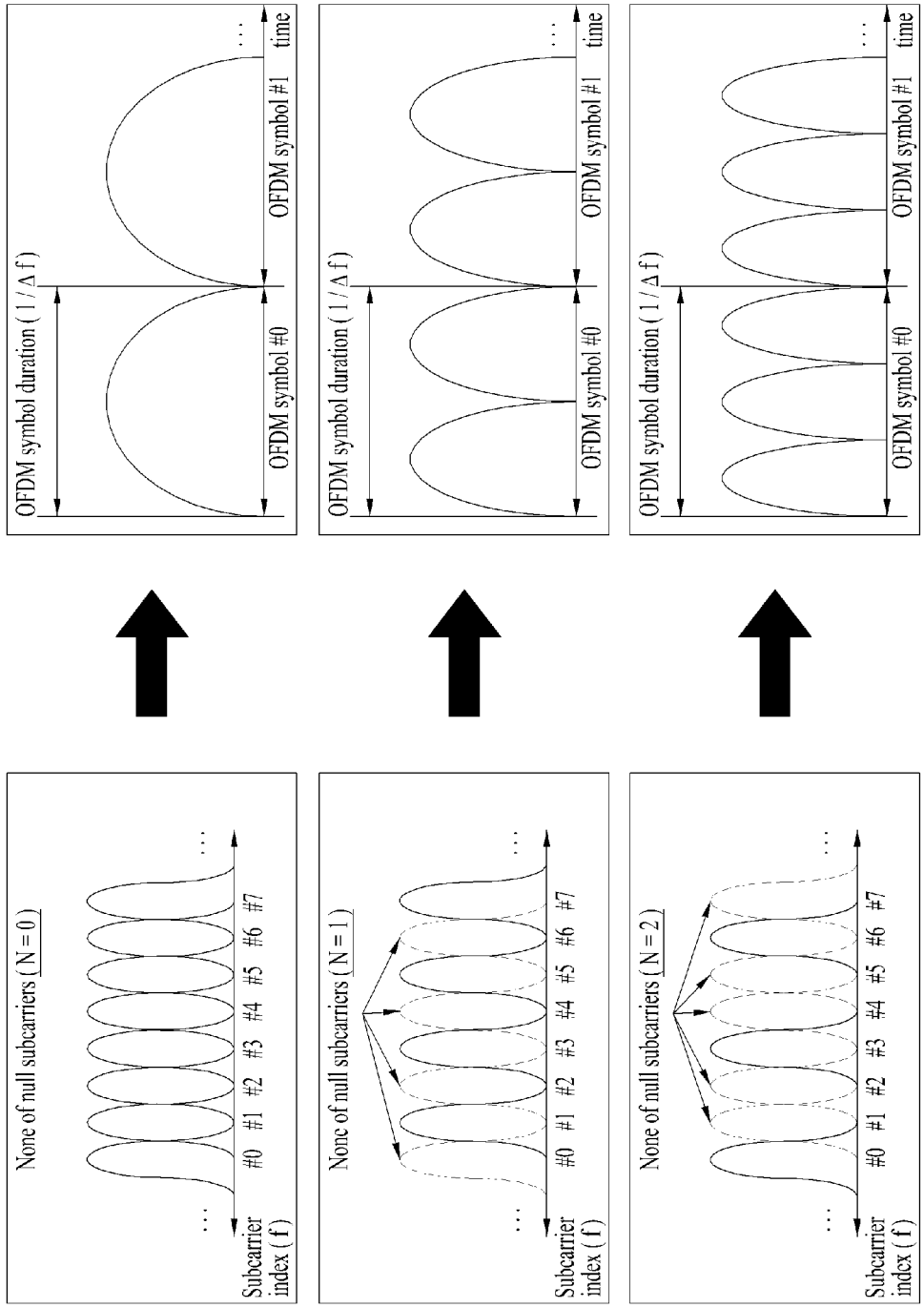

FIGS. 14 and 15 are diagrams for explaining an example of flexible frame configuration according to another embodiment of the present invention.

FIG. 14 is a diagram comparing the degree of a CFO effect according to insertion of a null subcarrier in an environment in which a CFO occurs due to the same Doppler's frequency.

Referring to FIG. 14, it can be appreciated that robustness is obtained with respect to a frequency offset caused by the Doppler's frequency because null subcarriers are inserted between subcarriers between which orthogonality should be maintained. That is, according to the present invention, a CFO permissible range in which an accurate signal can be detected increases.

FIG. 15 is a diagram illustrating an effect of insertion of a null frequency in the frequency domain on a signal in the time domain.

According to Proposal 2 of the present invention, since a null subcarrier, i.e. a zero subcarrier, is inserted in a state that a subcarrier spacing of the frequency domain is fixed, the same signal is repeated in the time domain. As can be appreciated with reference to FIG. 15, the same waveform is repeated according to the number of zeroes inserted in the same OFDM symbol period. That is, the same signal is (repeatedly) transmitted (N+1) times in the same OFDM symbol period according to the number N (≥0) of null subcarriers inserted between subcarriers on which data is actually allocated, i.e. between a nonzero-power subcarrier and an adjacent nonzero-power subcarrier. In Proposal 1-2 of the present invention, the subcarrier spacing Δf is not changed and the sampling period $T_s$ and the sampling frequency $f_s$ are also used without change. Notably, as mentioned previously, insertion of the null subcarrier leads to resource loss and transmission rate reduction in the frequency domain. Therefore, Proposal 2 of the present invention may be applied only for a special situation or purpose and may be limitedly applied. For example, Proposal 2 of the present invention may be limitedly applied only to the case in which a link situation caused by the Doppler effect is abruptly deteriorated or may be applied only for the purposes of maintaining a link access situation.

Hereinafter, Proposal 2-1 and Proposal 2-2, which are application examples of Proposal 2 of the present invention, will be described.

Proposal 2-1) The eNB changes an effective subcarrier spacing of a resource allocation region of each UE without changing a subcarrier spacing of a frame according to change of the Doppler's frequency on a link.

Figure 16:
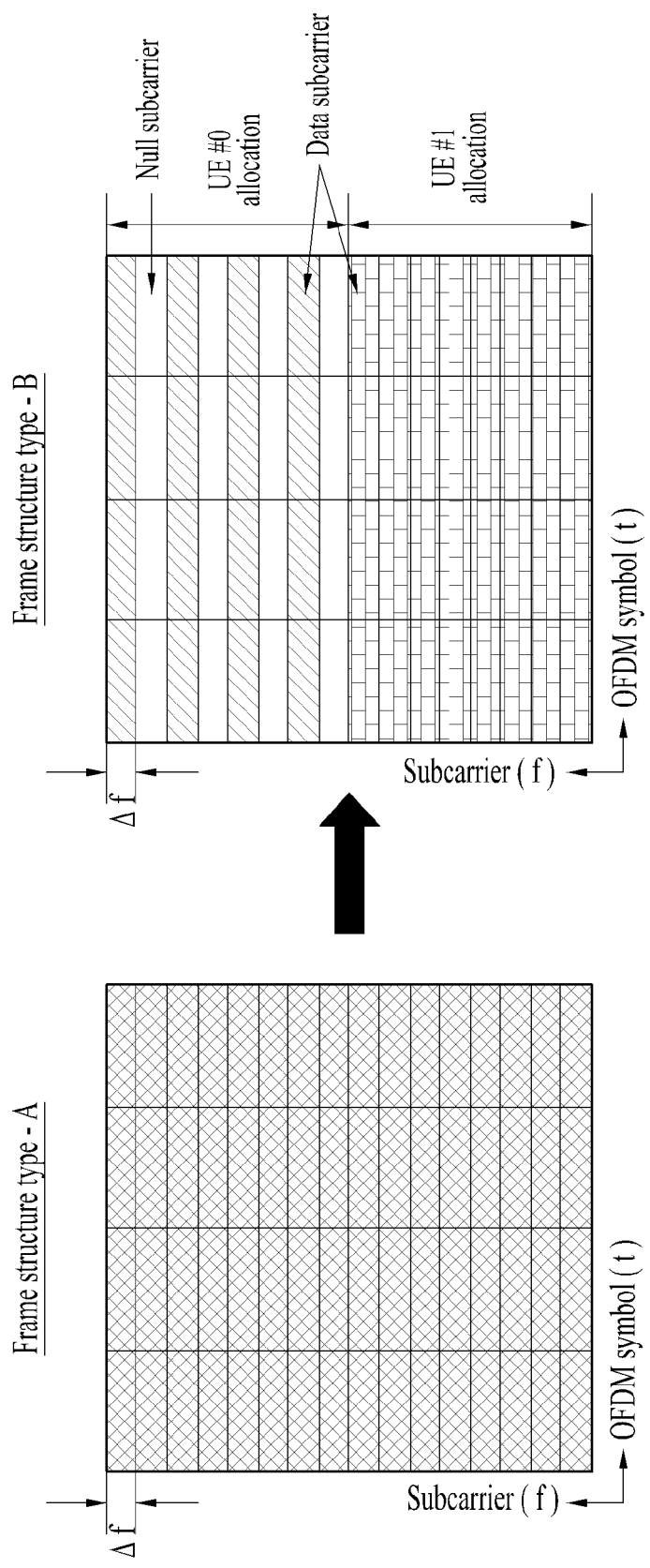
FIG. 16 illustrates an example of a flexible frame structure according to another embodiment of the present invention.

FIG. 16 illustrates an example of a flexible frame structure according to another embodiment of the present invention.

In Proposal 2-1 of the present invention, the eNB may apply a flexible frame per UE upon configuring an entire frame. In other words, the eNB according to Proposal 2-1 of the present invention may adjust insertion of null subcarriers per UE. This is because Proposal 2 of the present invention changes an effective subcarrier spacing to relieve or eliminate an effect caused by the Doppler effect by inserting null subcarriers without changing a subcarrier spacing or a sampling frequency/period, as described above. Accordingly, since Proposal 2 of the present invention maintains the subcarrier spacing and sampling frequency/period, the eNB of the present invention can adjust the effective subcarrier spacing only in a resource region per UE allocated to the UE. That is, the eNB may differently apply the effective subcarrier spacing according to a channel state of the resource region allocated to the UE, i.e. a channel state of a resource allocation region. Information about the effective subcarrier spacing and/or adjustment of the effective subcarrier spacing may be UE-specifically transmitted through a higher layer (e.g. RRC) signal or a physical layer signal (e.g. PDCCH).

Referring to FIG. 16, the eNB or the UE of the present invention may apply a flexible frame according to the present invention by changing an effective subcarrier spacing of a resource allocation region which is differently allocated per UE#0 or UE#1. For example, if the mobile speed of UE#0 is fast or the Doppler's frequency in the resource allocation region for UE #0 increases, the effective subcarrier spacing increases in the resource allocation region of UE#0 by inserting a predetermined number (≥1) of consecutive null subcarrier(s), determined based on the mobile speed of the UE or the Doppler's frequency, between nonzero subcarriers. For example, if the number of consecutive null subcarriers inserted between two nonzero subcarriers is 1, since a nonzero-power subcarrier and a zero-power subcarrier alternate with each other along the frequency axis (i.e. in the frequency domain), the Doppler effect which is not offset by a basic subcarrier spacing can be offset. Meanwhile, for UE#0 in which the Doppler effect can be sufficiently offset even by the basic (effective) subcarrier spacing, null subcarriers are not inserted. If the number of inserted null subcarriers is '0', this may mean that a nonzero-power subcarrier and zero zero-power subcarrier alternate. The eNB may transmit frame configuration information indicating insertion of null subcarriers and/or the number of inserted null subcarriers to the UE. If the eNB informs the UE that null subcarrier(s) are inserted, in the case of DL, the eNB transmits a DL signal to the UE by inserting null subcarriers(s) between subcarriers of a resource region allocated to the UE and the UE receives, decodes, or demodulates the DL signal under the assumption that inserted null subcarrier(s) are present between subcarriers of the resource region allocated thereto. If the eNB informs the UE that null subcarrier(s) are inserted, in the case of UL, the UE transmits a UL signal by inserting the null subcarriers between subcarriers of a resource region allocated thereto and the eNB receives, decodes, or demodulates the UL signal in the resource region under the assumption that the null subcarrier(s) are present between subcarriers of the resource region allocated to the UE. A transmitting end may not map a signal or information to be transmitted on the null subcarriers, or may not allocate transmit power to the null subcarriers even when a signal/information is carried on the null subcarriers. That is, the transmitting end transmits a signal on a subcarrier corresponding to a null subcarrier with transmit power of '0'. A receiving end receives, decodes, or demodulates the signal transmitted by the transmitting end by assuming that the transmit power of the subcarrier corresponding to the null subcarrier is '0'.

Proposal 2-2) The eNB changes an effective subcarrier spacing of the entire system without changing a subcarrier spacing of a frame according to change of the Doppler's frequency on a link.

Figure 17:
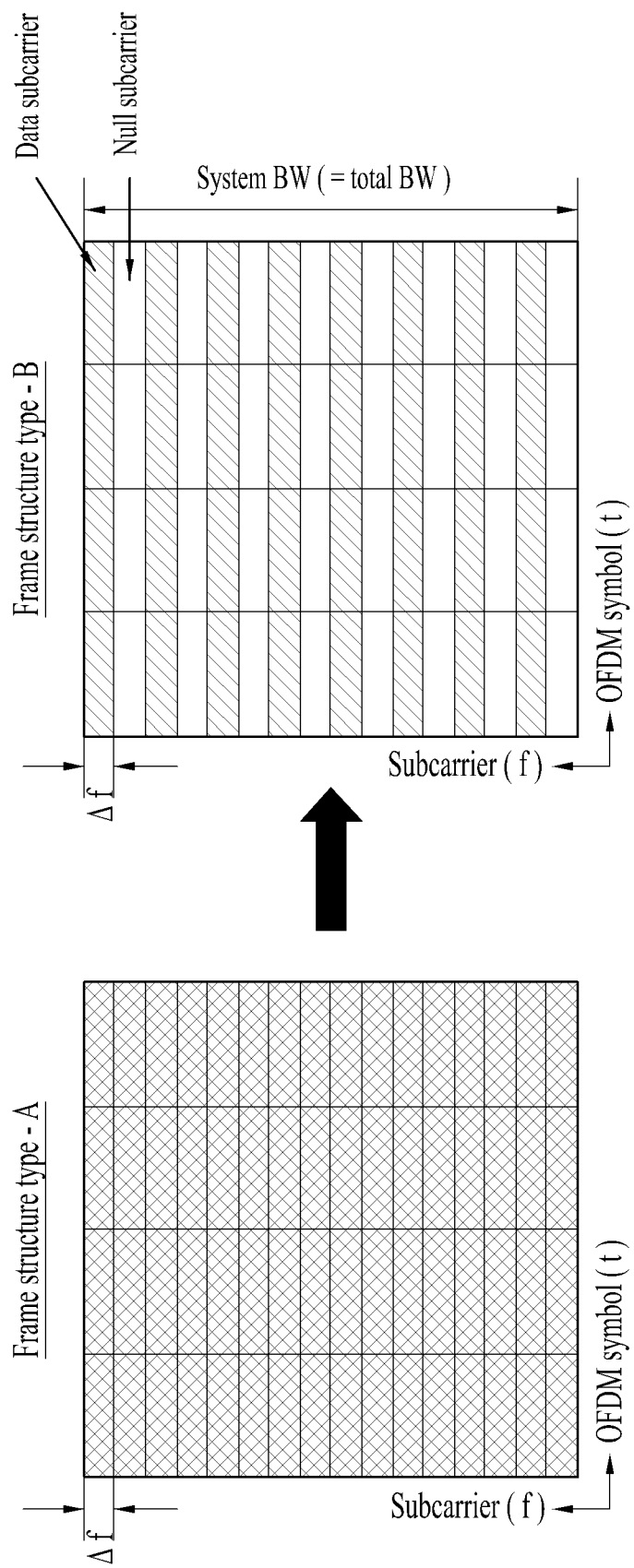
FIG. 17 illustrates another example of a flexible frame structure according to another embodiment of the present invention.

FIG. 17 illustrates another example of a flexible frame structure according to another embodiment of the present invention.

Proposal 2-2 of the present invention configures a flexible frame by changing an effective subcarrier spacing of an entire frequency resource region. That is, according to Proposal 2-2 of the present invention, the eNB may apply the flexible frame in the entire frequency region in configuring the entire frame. That is, the eNB changes a frame structure by equally changing an effective subcarrier spacing with respect to all UEs accessing the eNB instead of applying an effective subcarrier spacing per UE. Similarly to Proposal 2-1 of the present invention, since Proposal 2-2 of the present invention offsets the Doppler effect by inserting null subcarriers without changing a subcarrier spacing or a sampling frequency/period, factors of changing a transmission or reception process according to change of the frame structure do not occur.

For example, referring to FIG. 17, if the effective subcarrier spacing should be doubled due to increase of the Doppler's frequency, the eNB may inform the UE(s) communicating through a high frequency band that the effective subcarrier spacing should be doubled or that null subcarriers should be inserted between subcarriers. In this case, the UE transmits or receives signals under the assumption that a subcarrier having nonzero power (i.e. a nonzero-power subcarrier) and a subcarrier having zero transmit power (i.e. zero-power subcarrier) alternate with each other in the entire system band operating in a center frequency at which a link with the eNB is formed. The transmitting end may not carry signals on a null subcarrier, or may carry signals irrespective of whether a subcarrier is the null subcarrier or not and transmit signals by puncturing signals on the null subcarrier. The receiving end receives signals in a resource region allocated for the signals under the assumption that the null subcarrier has no information or information mapped to the null subcarrier is transmitted with zero transmit power.

In Proposal 2 of the present invention described above, subcarriers of a frame are deployed in every (basic) subcarrier spacing along the frequency axis or in the frequency domain, wherein a nonzero-power subcarrier and N (≥0) zero-power subcarrier(s) alternate with each other. If the number of zero-power subcarriers alternating with the nonzero-power subcarrier is 0, the effective subcarrier spacing becomes equal to the basic subcarrier spacing. However, if the number of zero-power subcarriers alternating with the nonzero-power subcarriers is X, the effective subcarrier spacing will be X times the basic subcarrier spacing.

Although the above-described flexible frame of the present invention has been described focusing on the case in which the frame structure is changed to have an increased (effective) subcarrier spacing for the case in which the Doppler's frequency increases from a low value to a high value, it is apparent that the frame structure is changed to have a decreased (effective) subcarrier spacing for the case in which the Doppler's frequency decreases from a high value to a low value. For example, in order to offset increase of the Doppler's frequency, the frame structure may be changed such that an (effective) subcarrier spacing $\Delta f_2$ after change of the frame structure becomes a multiple of a positive integer of an (effective) subcarrier spacing $\Delta f_1$ before change of the frame structure or in order to cope with reduction in the Doppler's frequency, the frame structure may be changed such that the (effective) subcarrier spacing $\Delta f_1$ before change of the frame structure becomes a multiple of a positive integer of the (effective) subcarrier spacing $\Delta f_2$ after change of the frame structure. As another example, the (effective) subcarrier spacing $\Delta f_2$ may be multiplication of the 'existing subcarrier spacing 15 kHz' corresponding to the (effective) subcarrier spacing $\Delta f_1$ and 'involution of a positive integer'. Namely, the relationship of '$\Delta f_2/\Delta f_1=a^n$' (where a is a positive integer and n is an integer) is satisfied, wherein, if the Doppler's frequency increases out of a predetermined range, n may be a positive integer, if the Doppler's frequency decreases out of a predetermined range, n may be a negative integer, and if the Doppler's frequency is maintained in a predetermined range, n may be 0. Although the frame configuration information for changing a frame structure type according to an embodiment of the present invention may be transmitted when the Doppler's frequency is changed to a degree which is not proper for current frame configuration or when more proper frame configuration is present for the changed Doppler's frequency, the frame configuration information may be periodically transmitted. That is, the eNB may transmit the frame configuration information when change of the frame structure is needed but may periodically transmit the frame configuration information. If the frame configuration information is periodically transmitted, the frame configuration information transmitted at a previous transmission timing may be the same as the frame configuration information transmitted at a current transmission timing unless the Doppler's frequency is abruptly changed. For example, if a transmission timing for the frame configuration information is present in every predetermined period, the (effective) subcarrier spacing $\Delta f_1$ according to the frame configuration information of the previous transmission timing may be equal to the (effective) subcarrier spacing $\Delta f_2$ according to the frame configuration information of the current transmission timing unless the Doppler's frequency is abruptly changed. Alternatively, information about whether the frame configuration information of the previous transmission timing is equal to or different from the frame configuration information of the current transmission timing may be transmitted as the frame configuration information. Only in the case in which the frame configuration information of the previous transmission timing is different from the frame configuration information of the current transmission timing, the frame configuration information actually including parameter(s) corresponding to a corresponding frame structure may be transmitted.

In configuring the flexible frame of the present invention described above, a subcarrier spacing or an effective subcarrier spacing according to each Doppler's frequency may be predetermined according to specific criteria. For example, (effective) subcarriers according to Doppler's frequencies may be determined using Equation 1 to Equation 4. In configuring the flexible frame of the present invention, frame structures according to (effective) subcarrier spacings may be variously predefined and the eNB may configure a proper frame structure per UE, per frequency resource region, or per cell and inform the UE(s) of the configured frame structure. Each UE may receive frame structure configuration information and adjust a subcarrier spacing according to the corresponding frame structure configuration information, or may receive a DL signal under the assumption that null subcarrier(s) are inserted between subcarriers or transmit a UL signal by inserting null subcarrier(s) between subcarriers. According to Proposal 1 of the present invention, a sampling frequency, a sampling period, an FFT size, etc. according to change of the subcarrier spacing may be determined according to any one of the embodiments of Proposal 1 of the present invention. According to Proposal 2 of the present invention, since the subcarrier spacing is not actually changed even though an effective subcarrier spacing is changed, the sampling frequency, the sampling period, the FFT size, etc. can be maintained without change.

The flexible frame of the present invention may be applied to a high frequency band. For example, the flexible frame of the present invention may be applied to a frequency band, a center frequency of which is 20 GHz to 60 GHz.

When carrier aggregation is configured, a frame structure per serving CC of a UE may be configured. For example, for a UE configured with multiple serving CCs, a frame using a basic subcarrier spacing may be configured in one serving CC and a frame using an (effective) subcarrier spacing larger than the basic subcarrier spacing may be configured in the other serving CCs, according to the Doppler effect for each serving CC.

Figure 18:
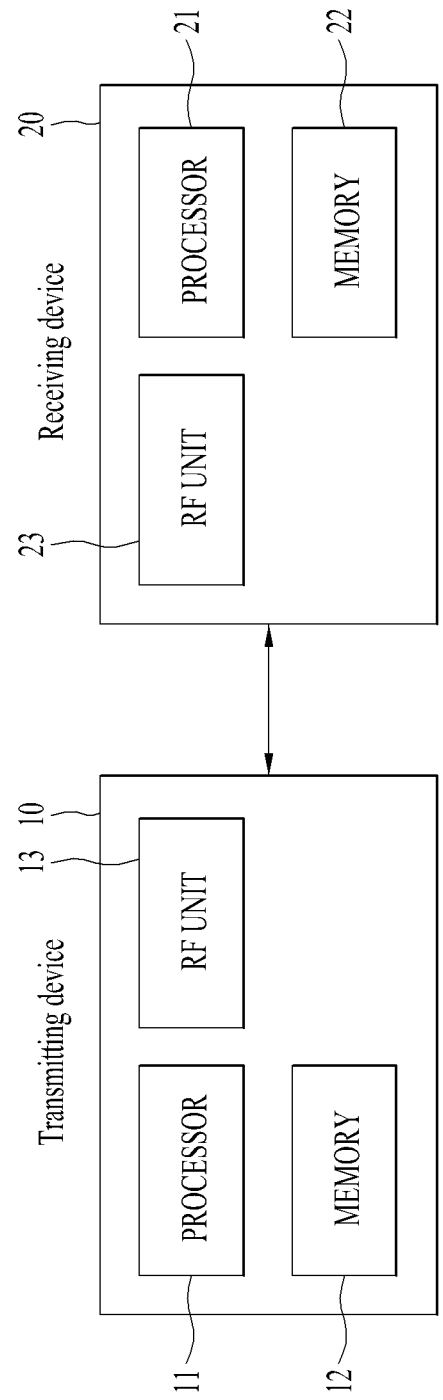
FIG. 18 is a block diagram illustrating elements of a transmitting device 10 and a receiving device 20 for implementing the present invention.

FIG. 18 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In the present invention, each node or each transmission point includes an eNB RF unit. In the present invention, nodes participating in carrier aggregation may be managed by one or multiple eNB processors. In other words, cells or CCs participating in carrier aggregation may be managed by the same eNB processor or by different eNB processors.

The eNB processor according to the present invention may flexibly change frame configuration according to any one of the embodiments of Proposal 1 and Proposal 2 of the present invention. A flexible frame according to Proposal 1 or Proposal 2 of the present invention may be applied to a specific frequency band, e.g. a high frequency band. The eNB processor according to Proposal 1 or Proposal 2 of the present invention may control the eNB RF unit to transmit frame configuration information indicating frame configuration corresponding to an (effective) subcarrier when an (effective) subcarrier spacing should be changed or at a periodic interval.

The eNB processor according to Proposal 1 of the present invention may change frame configuration from a change frame in which a subcarrier spacing is $\Delta f_1$ to a frame configuration in which a subcarrier spacing is $\Delta f_2$. The eNB processor causes the eNB RF unit to transmit frame configuration information indicating change of frame configuration or frame configuration information indicating a frame structure corresponding to the subcarrier spacing $\Delta f_2$, so that the eNB processor informs UE(s) accessing the corresponding eNB that a frame for communication between the eNB and the UE(s) should be configured according to the frame structure corresponding to the subcarrier spacing $\Delta f_2$. The UE processor may cause the UE RF unit to receive the frame configuration information. The UE processor is configured to configure a frame by changing a subcarrier spacing from $\Delta f_1$ to $\Delta f_2$ based on the frame configuration information.

The eNB processor and the UE processor according to Proposal 1-1 of the present invention adjusts only a subcarrier spacing in the frequency domain and use the same sampling period in the time domain. According to Proposal 1-1 of the present invention, a system BW of a specific frequency band is kept equal even when the subcarrier spacing is adjusted, i.e. even when the frame structure is changed. The eNB processor and the UE processor according to Proposal 1-1 of the present invention may be configured to maintain a sampling frequency by reducing an FFT size to $(\Delta f_2/\Delta f_1)^{-1}$ times when the subcarrier spacing is increased $\Delta f_2/\Delta f_1$ times from $\Delta f_1$ to $\Delta f_2$. If the eNB processor and the UE processor according to Proposal 1-1 of the present invention change frame configuration from a frame configuration in which the subcarrier spacing is $\Delta f_1$ to a frame configuration in which the subcarrier spacing is $\Delta f_2$, the number of OFDM symbols in the same TTI becomes $\Delta f_2/f_1$ times. The eNB processor and the UE processor according to Proposal 1-1 of the present invention may be configured to configure an FFT block according to each FFT size. For example, if an FFT size corresponding to the subcarrier spacing $\Delta f_1$ is $FFT_{size,1}$ and an FFT size corresponding to the subcarrier spacing $\Delta f_2$ is $FFT_{size,2}$, the eNB processor and the UE processor according to Proposal 1-1 of the present invention are configured to configure both an FFT block having a size of $FFT_{size,1}$ and an FFT block having a size of $FFT_{size,2}$.

The eNB processor and the UE processor according to Proposal 1-2 of the present invention the present invention change a subcarrier spacing in the frequency domain and simultaneously change a sampling frequency in the frequency domain and a sampling period in the time domain. Notably, the eNB processor and the UE processor according to Proposal 1-2 of the present invention are configured to identically maintain an FFT size even though the subcarrier spacing is changed. According to Proposal 1-2 of the present invention, if the subcarrier spacing is adjusted, the FFT size is maintained and thus a system BW varies according to the subcarrier spacing and the FFT size. However, since a basic system BW of a specific frequency band is fixed, if the system BW determined according to the subcarrier spacing is greater than the basic system BW, the eNB processor and the UE processor according to Proposal 1-2 of the present invention set subcarriers corresponding to a BW of the difference between the system BW determined according to the subcarrier spacing and the basic system BW to null subcarriers in order to offset the difference between the system BW and the basic system BW. In this case, subcarriers, which are distant from the center of the specific frequency band, are set to the null subcarriers. The eNB processor according to Proposal 1-2 of the present invention may be configured not to allocate a resource to the null subcarriers. The UE processor determines a time-frequency resource to be used to transmit a UL signal or receive a DL signal, based on resource allocation information from the eNB. The UE processor according to Proposal 1-2 of the present invention may not calculate or generate UL control information (e.g. channel state information) for the null subcarriers.

The eNB processor and the UE processor according to Proposal 1-2 of the present invention may be configured to change the sampling frequency to $\Delta f_2/\Delta f_1$ times and change the sampling period to $(\Delta f_2/\Delta f_1)^{-1}$ times, when the subcarrier spacing is increased $\Delta f_2/f_1$ times from $\Delta f_1$ to $\Delta f_2$ The eNB processor according to Proposal 2 of the present invention may be configured to determine an effective subcarrier spacing or a frame structure. The eNB processor according to Proposal 2-1 of the present invention may be configured to determine the effective subcarrier spacing or the frame structure in a resource region allocated to a specific UE among resource regions of a specific frequency band. The eNB processor according to Proposal 2-2 of the present invention may be configured to determine the effective subcarrier spacing or the frame structure with respect to the total system BW of the specific frequency band.

The eNB processor according to Proposal 2 of the present invention may control the eNB RF unit to transmit information indicating the determined frame structure, or frame configuration information indicating the effective subcarrier spacing (e.g. information indicating the number N+1 of subcarriers corresponding to a nonzero-power subcarrier spacing or information indicating the number N of zero-power subcarriers configured between two (consecutive) nonzero-power subcarriers). The eNB processor may configure nonzero-power subcarriers in every (N+1) subcarriers among subcarriers in the resource region allocated to the specific UE according to Proposal 2-1 of the present invention or subcarriers in the total system BW of the specific frequency band according to Proposal 2-2 of the present invention and configure zero-power subcarriers between the nonzero-power subcarriers. The eNB processor may not map a signal to a zero-power subcarrier, or may adjust transmit power to '0' even if the signal is mapped to the zero-power subcarrier. The UE processor may cause the UE RF unit to receive the frame configuration information. The UE processor may apply a frame according to the frame configuration information to only a resource region allocated to a corresponding UE among a system BW of a specific frequency band according to Proposal 2-1 of the present invention or to the total system BW of the specific frequency band according to Proposal 2-2 of the present invention. The UE processor may configure the frame according to the frame configuration information only in a resource region allocated to a corresponding UE among the system BW of the specific frequency band according to Proposal 2-1 of the present invention or in the total system BW of the specific frequency band according to Proposal 2-2 of the present invention. In the case of DL, the UE processor may be configured to receive, decode, and/or demodulate a DL signal under the assumption that transmit powers of zero-power subcarriers are '0'. In the case of UL, the UE processor transmits a UL signal in a UL resource region allocated to a corresponding UE, wherein the UE processor transmits the UL signal by setting the transmit powers of zero-power subcarriers in the UL resource region to '0'.

According to the present invention, a frame which is suitable for channel characteristics of a newly introduced frequency band in a future communication system, for example, for channel characteristics of a high frequency band, is configured, thereby improving system performance.

INDUSTRIAL APPLICABILITY

The embodiments of the present invention are applicable to an eNB, a UE, or other devices in a wireless communication system.

The invention claimed is:

1. A method for configuring a radio frame by a user equipment, the method comprising:
receiving frame configuration information;
changing a frame configuration for a specific frequency band based on the frame configuration information from a first frame configuration to a second frame configuration; and
transmitting or receiving a signal using a frame configured according to the second frame configuration,
wherein changing the frame configuration includes changing a nonzero-power subcarrier spacing in a frequency domain from 'N1+1'·Δf according to the first frame configuration to 'N2+1'·Δf according to the second frame configuration,
wherein Δf is a subcarrier spacing,
wherein N1 is a number of consecutive zero-power subcarriers configured between every two nonzero-power subcarriers according to the first frame configuration, and
wherein $N_2$ is the number of consecutive zero-power subcarriers configured between every two nonzero-power subcarriers according to the second frame configuration.

2. The method according to claim 1,
wherein a sampling frequency fs,2 of the frame configured according to the second frame configuration is equal to a sampling frequency fs,1 according to the first frame configuration, and
wherein, a sampling time Ts,2 of the frame configured according to the second frame configuration is equal to a sampling time Ts,1 according to the first frame configuration.

3. The method according to claim 1,
wherein the frame configuration information is applied to a resource region allocated to the user equipment in the specific frequency band.

4. The method according to claim 1,
wherein the frame configuration information is applied to a total system bandwidth of the specific frequency band.

5. A user equipment for configuring a radio frame, the user equipment comprising:
a radio frequency (RF) unit; and
a processor configured to control the RF unit, the processor configured to:
control the RF unit to receive frame configuration information;
change a frame configuration for a specific frequency band based on the frame configuration information from a first frame configuration to a second frame configuration; and
control the RF unit to transmit or receive a signal using a frame configured according to the second frame configuration,
change a nonzero-power subcarrier spacing in a frequency domain from 'N1+1'·Δf according to the first frame configuration to 'N2+1'·Δf according to the second frame configuration,
wherein Δf is a subcarrier spacing,
wherein N1 is a number of consecutive zero-power subcarriers configured between every two nonzero-power subcarriers according to the first frame configuration, and
wherein $N_2$ is the number of consecutive zero-power subcarriers configured between every two nonzero-power subcarriers according to the second frame configuration.

6. The user equipment according to claim 5,
wherein a sampling frequency fs,2 of the frame configured according to the second frame configuration is equal to a sampling frequency fs,1 according to the first frame configuration, and
wherein, a sampling time Ts,2 of the frame configured according to the second frame configuration is equal to a sampling time Ts,1 according to the first frame configuration.

7. The user equipment according to claim 5,
wherein the processor is configured to apply the frame configuration information to a resource region allocated to the user equipment in the specific frequency band.

8. The user equipment according to claim 5,
wherein the processor is configured to apply the frame configuration information to a total system bandwidth of the specific frequency band.

9. A method for configuring a radio frame by a base station, the method comprising:
transmitting frame configuration information;
changing a frame configuration for a specific frequency band according to the frame configuration information from a first frame configuration to a second frame configuration; and
transmitting or receiving a signal using a frame configured according to the second frame configuration,
wherein changing the frame configuration includes changing a nonzero-power subcarrier spacing in a frequency domain from 'N1+1'·Δf according to the first frame configuration to 'N2+1'·Δf according to the second frame configuration,
wherein Δf is a subcarrier spacing,
wherein N1 is a number of consecutive zero-power subcarriers configured between every two nonzero-power subcarriers according to the first frame configuration, and
wherein $N_2$ is the number of consecutive zero-power subcarriers configured between every two nonzero-power subcarriers according to the second frame configuration.

10. The method according to claim 9,
wherein a sampling frequency fs,2 of the frame configured according to the second frame configuration is equal to a sampling frequency fs,1 according to the first frame configuration, and
wherein, a sampling time Ts,2 of the frame configured according to the second frame configuration is equal to a sampling time Ts,1 according to the first frame configuration.

11. The method according to claim 9,
wherein the frame configuration information is applied to a resource region allocated to the user equipment in the specific frequency band.

12. The method according to claim 9,
wherein the frame configuration information is applied to a total system bandwidth of the specific frequency band.

13. A base station for configuring a radio frame, the base station comprising:
a radio frequency (RF) unit; and
a processor configured to control the RF unit, the processor configured to:
control the RF unit to transmit frame configuration information;
change a frame configuration for a specific frequency band based on the frame configuration information from a first frame configuration to a second frame configuration;
control the RF unit to transmit or receive a signal using a frame configured according to the second frame configuration; and
change a nonzero-power subcarrier spacing in a frequency domain from 'N1+1'·$\Delta f$ according to the first frame configuration to 'N2+1'·$\Delta f$ according to the second frame configuration,
wherein ·$\Delta f$ is a subcarrier spacing,
wherein N1 is a number of consecutive zero-power subcarriers configured between every two nonzero-power subcarriers according to the first frame configuration, and
wherein $N_2$ is the number of consecutive zero-power subcarriers configured between every two nonzero-power subcarriers according to the second frame configuration.

14. The base station according to claim 13,
wherein the processor is configured to apply the frame configuration information to a resource region allocated to the user equipment in the specific frequency band.

15. The base station according to claim 13,
wherein the processor is configured to apply the frame configuration information to a total system bandwidth of the specific frequency band.

16. The base station according to claim 13,
wherein a sampling frequency $f_{s,2}$ of the frame configured according to the second frame configuration is equal to a sampling frequency $f_{s,1}$ according to the first frame configuration, and
wherein, a sampling time $T_{s,2}$ of the frame configured according to the second frame configuration is equal to a sampling time $T_{s,1}$ according to the first frame configuration.

* * * * *